United States Patent

Anger et al.

[11] 3,732,474
[45] May 8, 1973

[54] POSITIONING CONTROL SYSTEM FOR A MACHINE THAT PERFORMS WORK ON A MOVING PART

[75] Inventors: Ernest G. Anger, Wauwatosa; Giles J. Richards, Menomonee Falls; John F. Bloodgood, Fond du Lac; Roy J. Geiger, Cedarburg, all of Wis.

[73] Assignee: Square D Company, Park Ridge, Ill.

[22] Filed: May 1, 1972

[21] Appl. No.: 248,944

Related U.S. Application Data

[62] Division of Ser. No. 146,110, May 24, 1971, Pat. No. 3,686,556.

[52] U.S. Cl. ................... 318/257, 318/314, 318/341
[51] Int. Cl. ................................................ H02p 5/06
[58] Field of Search ...................... 318/257, 314, 341

[56] References Cited

UNITED STATES PATENTS

| | | |
|---|---|---|
| 3,355,640 | 11/1967 | Lewis et al. .................... 318/257 X |
| 3,439,246 | 4/1969 | Moritz ............................ 318/257 |
| 3,579,080 | 5/1971 | Vollrath .......................... 318/257 X |
| 3,500,160 | 3/1970 | Sommer ......................... 318/314 X |
| 3,612,974 | 10/1971 | Wolf ............................... 318/257 |

Primary Examiner—Benjamin Dobeck
Attorney—Harold J. Rathbun et al.

[57] ABSTRACT

A programmable and manually operable control system for controlling the position of a machine relative to a workpiece so the machine may perform work at various locations on the workpiece while the workpiece is moved by the conveyor. The system includes a pair of synchro resolvers which provide output signals indicative of the position of the machine relative to a datum position and a pair of synchro resolvers which provide output signals indicative of the position of the conveyor relative to the datum position. The outputs of the machine indicating resolvers provide the inputs to the conveyor indicating resolvers and the outputs of the conveyor indicating resolvers are compared with command signals that are generated by a continuously recycling counter which has been preset by signals from a memory so the displacement between selected locations on the workpiece and the machine is electrically measured without using differential mechanical gearing. The control system is arranged so the machine will move synchronously with the workpiece, independently of the workpiece, and synchronously with the workpiece while the machine is moving from one preprogrammed location to a new preprogrammed location on the workpiece.

6 Claims, 10 Drawing Figures

POSITIONING CONTROL SYSTEM FOR A MACHINE THAT PERFORMS WORK ON A MOVING PART

This is a division of application Ser. No. 146,110, filed May 24, 1971, now U.S. Pat. No. 3,686,556.

The present invention relates to positioning control, and more particularly to a control system for positioning a machine at desired positions along a workpiece while the workpiece is moving along a predetermined path relative to a datum position.

In the field of positioning control, various systems have been proposed for moving a controlled member in accordance with instructions stored within a memory so that work may be automatically performed upon a workpiece. In these prior systems, the maximum range of movement of the controlled member is usually limited to a few feet and generally the workpiece is maintained stationary while work is performed by the controlled member. Thus the systems as heretofore known are not particularly suited to control the positioning of a machine which performs work at various positions along the entire length of the body of an automotive vehicle while the body is transported by a moving conveyor through a work station.

A technique commonly practiced in factories which manufacture or assemble mass-produced automotive vehicles requires that the components of the subassemblies for a complete vehicle be assembled to each other while the components are carried by a suitable support that is moved by a conveyor past the various work stations where parts are secured to each other to complete the subassembly. For example, the fabrication of a subassembly, called the body of the vehicle, is normally accomplished by accurately positioning the components on a fixture, called a body truck, and moving the body truck past work stations where the parts of the body are welded together. The welding of the parts is accomplished by welding guns which are manually moved to the desired positions along the body parts to secure the parts together by a series of spot welds which are sequentially formed as the gun is positioned at spaced locations along the body parts. While the manual formation of spot welds has proven satisfactory, it is objectionable in that it not only depends upon the skill of the gun operator to accurately locate the welds and to assure that the proper number of welds are made between the parts, but it also occasionally requires the operator to assume physically uncomfortable and exhausting positions to make the welds.

While it is apparent that the machine as controlled by the control system as will be hereinafter described may be readily modified to perform a variety of operations upon workpieces while the workpieces are moving along a predetermined path, the control system is described as controlling the positioning of a resistance welding gun to form spot welds between parts of an automotive vehicle body as the body parts are transported by a moving body truck along a conveyor line. One of the problems presented in synchronizing the operation of a machine with the position of parts carried on a conveyor is that, conventionally, the speed of the conveyor which moves the parts is not closely controlled. Another problem presented in using machines to perform work on body parts which are carried on a moving conveyor in an automotive vehicle factory is that to maximize production, it is imperative that the conveyor move continuously. This means that any malfunction of a machine which would require the conveyor to be stopped would be highly objectionable. One type of failure or malfunction which may occur in a resistance spot welding apparatus is the weld electrodes may be stuck to the parts which are being welded together. When this type of failure occurs and the apparatus is being manually operated, minimal difficulties result as the human operator merely moves along the line until the welding electrodes are freed from the body part. However, when this type of failure occurs in a machine controlled welding apparatus, more disasterous consequences may occur because of the capability of the machine to pull the parts from their position on the body truck or to mutilate the parts beyond use.

To successfully perform work upon a workpiece carried by a conveyor, a machine which performs the work must be capable of operating in several modes. In one mode of operation, the machine must be capable of moving upstream and independently of the conveyor to a position where it waits for a part to enter the work station and then move with the part to preprogrammed positions on the part where it performs its work as the part is moved through the work station. In another mode of operation, the machine must be capable of having its movements manually controlled when the conveyor is stationary. In another mode of operation, the machine must be capable of moving synchronously with the part as the part moves through the work station.

It is to be appreciated that while the control, as will be hereinafter described, is concerned with the positioning of a machine along a longitudinal axis relative to a part that is carried by a moving conveyor, a multiple axis control of the machine, i.e., six axis control, may be readily obtained by duplicating the necessary components of the control for the longitudinal axis with the exception that the synchro resolvers, which are used to synchronize the movement of the machine with the movement of the conveyor, are eliminated.

It is an object of the present invention to provide a control system for a machine which will automatically perform work on workpieces that are carried on a moving conveyor.

Another object is to provide a control system for a machine which will control the position of the machine relative to preselected positions on a part so the machine may perform work on the part while the part is moved by the conveyor.

A further object is to provide a control system for positioning a machine at desired positions along a workpiece while the workpiece is moving along a predetermined path relative to a datum position with a means for electrically synchronizing and controlling the movement of the machine with respect to the movement of the workpiece.

An additional object is to provide a control system for positioning a machine at desired positions along a workpiece while the workpiece is moving along a predetermined path relative to a datum position with a means for electrically synchronizing the movement of the machine with respect to the workpiece, with said synchronizing means including a first pair of synchro resolvers which provide an output indicative of the position of the machine relative to the datum position, a second pair of synchro resolvers which provide an output indicative of the position of the workpiece relative to the datum position, a means which is arranged to be energized by the output of the first pair of resolvers and provide an input to the second pair of resolvers and a means which is arranged to compare the outputs of the second resolvers with recycling command position signals and cause the command signals to correspond with the outputs of the second pair of resolvers when the machine is required to move synchronously with the workpiece along the path of movement of the workpiece.

A still further object is to provide a control system for positioning a machine at desired positions along a workpiece while the workpiece is moving along a predetermined path relative to a datum position with a means for electrically synchronizing the movement of the machine with respect to the workpiece that includes a pair of synchro resolvers each of which provides an output indicative of the position of the machine relative to the datum position, a second pair of synchro resolvers each of which provides an output signal indicative of the position of the workpiece relative to the datum position, a means for causing the inputs of the second pair of resolvers to be energized by the outputs of the first pair of resolvers and a means which compares both the order of occurrence and the interval between the occurrence of the output signals of the second pair of resolvers and a command signal and provides an error signal which has a magnitude dependent upon the interval between the signals and a direction indication controlled by the order of occurrence of the signals.

A still further object is to provide a control system for positioning a machine at desired positions along a workpiece while the workpiece is moving along a predetermined path relative to a datum position with a means for electrically synchronizing the movement of the machine with respect to the workpiece that includes a pair of synchro resolvers each of which provides an output indicative of the position of the machine relative to the datum position, a second pair of synchro resolvers each of which provides an output signal indicative of the position of the work piece relative to the datum position, a means for causing the inputs of the second pair of resolvers to be energized by the outputs of the first pair of resolvers and a means which compares both the order of occurrence and the interval between the occurrence of the output signals of the second pair of resolvers and a command signal and provides an error signal which has a magnitude dependent upon the interval between the signals and a direction indication controlled by the order of occurrence of the signals and to provide the control with a means which is manually operable to cause the machine to move independently of the signals.

Another object is to provide a control system for positioning a machine at desired positions along a workpiece while the workpiece is moving along a predetermined path relative to a datum position with a means which provides a feedback signal that is indicative of the relative positions of the workpiece and the machine relative to the datum position, a means including a recycling counter which provides a command signal phase that is preset to be indicative of a preselected position on the workpiece at which the machine is to be positioned while the workpiece is moving relative to the datum position and a hold means responsive to the feedback signal for causing the output of the counter to correspond to the feedback signal during periods when the hold means is activated.

An additional object is to provide a control system for positioning a machine at desired positions along a workpiece while the workpiece is moving along a predetermined path relative to a datum position with a means which provides a feedback signal that is indicative of the relative positions of the workpiece and the machine relative to the datum position, a means including a counter which provides a command signal that is indicative of a preselected position on the workpiece at which the machine is to be positioned while the workpiece is moving relative to the datum position, a jog means for causing the machine to move at either of two selected speeds independently of the workpieces when the jog means is activated, said jog means including circuitry that is responsive to the feedback signal for causing the output of the counter to correspond to the feedback signal during periods when the jog means is activated and a means which will cause the movement of the machine to increase at a preselected rate when the jog means is actuated and to abruptly decrease when the jog means is deactivated.

A further object is to provide a control system for positioning a machine at desired positions along a workpiece while the workpiece is moving along a predetermined path relative to a datum position with a means which provides a feedback signal that is indicative of the relative positions of the workpiece and the machine relative to the datum position, a means including a counter which provides a command signal that is indicative of a preselected position on the workpiece at which the machine is to be positioned while the workpiece is moving relative to the datum position and a jog means for causing the machine to move independently of the workpieces when the jog means is activated, said jog means including circuitry that is responsive to the feedback signal for causing the output of the counter to correspond to the feedback signal during periods when the jog means is activated.

Another object is to provide a control system for controlling the energization of an electric motor which drives a machine to desired positions along a workpiece while the workpiece is moving along a predetermined path relative to a datum position with a means which provides a feedback signal that is indicative of the relative positions of the machine and workpiece relative to the datum position, a means which provides a command signal that is indicative of a preselected commanded position on the workpiece at which the machine is to be positioned, said feedback and command signals consisting of a predetermined voltage change which occurs at predetermined instants during each cycle of a reference wave and respectively varying in time during each cycle depending upon the relative positions of the machine and workpiece from the datum position and the location of the desired position relative to the datum position, means for comparing both the order of occurrence and the interval between the occurrence of the voltage changes of the feedback and the command signal and providing an output signal pulse during each half cycle which has a width dependent upon the interval between said pulses and a polarity indicative of the order of occurrence of the pulses, and a deceleration means for controlling the direction of rotation and the speed of rotation of the motor in response to the polarity and width of the pulses, said deceleration means being arranged to exponentially increase the ratio between the width of the pulses and the energization of the motor as the width of the pulses decreases during periods when the machine is slowing down as the machine is approaching the commanded position.

Further objects and features of the invention will be readily apparent to those skilled in the art from the following specification and from the appended drawings illustrating certain preferred embodiments, in which.

Figure 1:
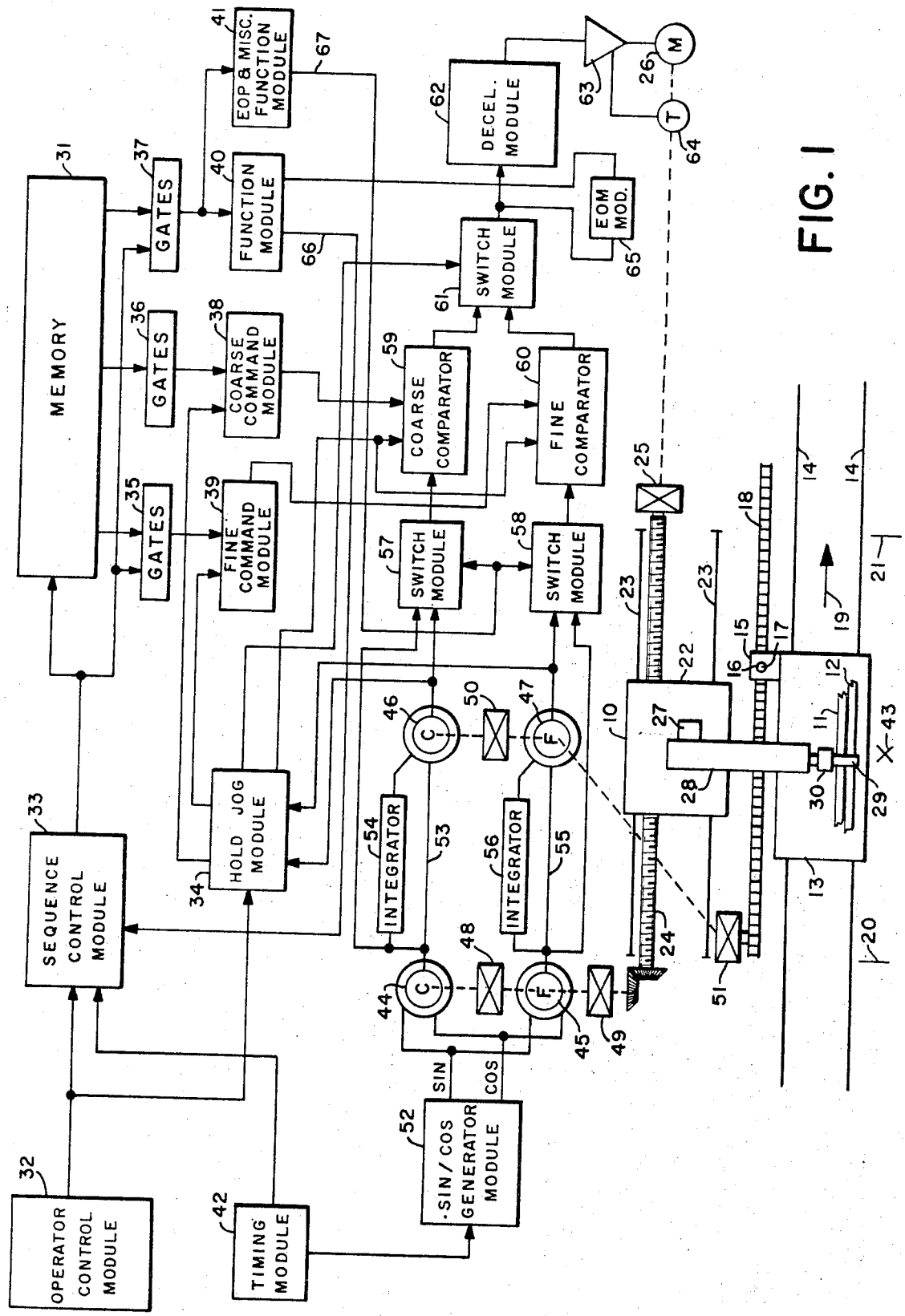
FIG. 1 shows in block diagram form a control system embodying the features of the present invention.

Referring now to the drawings, and more particularly to FIG. 1 thereof, the control system of the present invention is therein illustrated as controlling the position of a machine 10 relative to the position of a pair of workpieces 11 and 12, which represent parts of an automotive vehicle body, that are carried on a longitudinally movable fixture, known in automotive assembly plants as a body truck 13. In conventional practices, as followed in automotive assembly plants, a succession of spaced trucks 13 are continuously moved along a path dictated by a pair of spaced rails 14 past work stations where work is performed on the parts carried by the trucks. Each of the trucks 13, as used with the present system, has a block 15 secured at one of its longitudinal sides with an opening 16 accurately located in the block 15 relative to the workpieces 11 and 12. The opening 16 is located to receive a pin 17 that projects upwardly from a longitudinally movable chain 18 which is moved by the truck 13 horizontally along a path parallel to the rails 14 in the direction indicated by the arrow 19 as the truck 13 moves from an upstream end 20 of the work station, wherein the machine 10 is located, to the downstream end 21 of the work station. The chain 18 is arranged so that as a truck 13 enters the upstream end 20 of the work station, the pin 17 will be projected upwardly, by a means not shown, into the opening 16 to cause the chain as well as the pin 17 to be moved by the truck 13 downstream to the end 21 whereat the pin 17 is retracted from the opening 16 in the block 15 as the truck 13 carrying the fabricated workpieces 11 and 12 leaves the work station, so that the chain 18, including the pin 17 may be moved by a means, not shown, upstream to the upstream end 20 where it will be in a position to engage a block 15 on a subsequent truck 13, as the truck 13 enters the work station.

The machine 10 includes a base 22 that is movable along the parallel rails 23 along a path that is parallel and spaced from the path of movement of the truck 13. The base 22 is moved by a lead screw 24 through a suitable travelling nut, not shown, which is secured to the base 22 and arranged to be driven by the lead screw 24. The lead screw 24 is rotated through a suitable speed reducing gear box 25 by an electric motor 26. A vertical stanchion 27, which is secured on the base 22, supports an arm 28. The arm 28 is supported by the stanchion 27 so that the arm 28 may move horizontally along a horizontal axis that extends vertically to the path determined by the rails 14 and rotate about its horizontal axis. Secured on the free end of the arm 28 is a pair of electrodes, indicated as 29, which are arranged to engage and spot weld the workpieces 11 and 12 together. The electrodes 29 are movable by a suitable mechanism 30 in an arcuate path along a vertical axis as well as an arcuate path that extends horizontally. The horizontal arm 28 is also movable along a vertical axis on the stanchion 27. Thus the movement provided by the base 22 along the axis dictated by the rails 23, the vertical, horizontal and rotational movement of the arm 28 about the stanchion 27 and the movement provided by the mechanism 30 on the end of the arm 28 about the horizontal and vertical axes, will permit electrodes 29 to move along six axes relative to the workpieces 11 and 12.

A system which will control the horizontal positioning of the machine 10 along an axis parallel to the movement of the body truck 13 and the workpieces 11 and 12 includes a memory 31 which is preferably of the retentive type so that information stored therein will not be lost in the event of a power failure. The memory 31, as used herein, is a commercially available type, and includes an array of bistable state magnet cores which are capable of being programmed to have information stored therein. The information which is stored in the cores of the memory 31 includes positional information which will dictate the desired positions of the welding electrodes 29 relative to the workpieces 11 and 12, functional information which controls the operation of the welding electrodes, information which will control other mechanisms of the machine, such as operation solenoids and the like, and program information which will indicate that the programmed work for any particular type of parts 11 and 12, which may be mounted on the body truck, has been completed.

The operation of the control system is dictated by suitable circuitry within an operator control station module 32 which supplies input signals to a sequence control circuit module 33 and a hold-jog circuit module 34. While the control module 32 may be programmed to cause the control system to operate the machine 10 in modes other than are herein described, for purposes of understanding of the operation of the circuits which will be later described, the control module 32 is described as providing suitable output signals which will cause the machine to operate in an automatic mode, an indexing mode, a teach and jogging mode and a mode designated as hold.

The control module 32, when programmed to cause the machine to operate in the index or automatic mode, will provide signal inputs to the sequence control module 33 which will cause the digital command information stored within the memory 31 to be read out through gates 35, 36 and 37 and be respectively supplied as input information to a coarse command counter 38, a fine command counter 39, circuits within a function module 40 and circuits within an end of program and miscellaneous function module 41. The counters 38 and 39 are 1,000 bit recirculating counters and receive a continuous train of 500 KHZ reference input pulses from a system timing module 42. When the continuous train of 500 KHZ pulses is fed into the counters 38 and 39 and the counters 38 and 39 are reset by the reference input pulses and preset by the information from the memory 31, the train of 500 HZ pulses will appear at the output of the most significant bit of the counters 38 and 39 which will have a predetermined phase relationship with respect to a 500 HZ reference input signal pulses and thereby in effect divide each cycle of the 500 HZ input signal into 1,000 distinct command positions.

A position responsive means which provides a signal indicative of the position of the machine 10 relative to a datum position 43, located equidistant between the ends 20 and 21, includes a coarse feedback resolver 44 and a fine feedback resolver 45. Similarly, a position responsive means which will provide a signal indicative of the position of the pin 17 relative to the datum position includes a coarse feedback resolver 46 and a fine feedback resolver 47. Each of the resolvers 44-47 is a synchro type resolver and includes a rotatable shaft, a pair of input windings wound in spaced quadrature and an output winding that provides a cyclic output voltage signal which varies in phase relative to the phase of the voltage across its input windings with the angular position of the shaft when the input windings are respectively energized from an alternating current source by equal magnitude alternating voltages that are in quadrature.

The shaft of the coarse feedback resolver 44 is connected through a gear box 48 to be rotated by the lead screw 24 one complete revolution when the machine 10 is moved twice the distance between the ends 20 and 21. The shaft of the fine feedback resolver 45 is connected through a gear box 49 to be rotated by the lead screw 20 revolutions for each revolution of the shaft of the coarse resolver 44. The shaft of the coarse feedback resolver 46 is connected through a gear box 50 to be rotated in response to the movement of the chain 18 one complete revolution when the pin 17 is moved twice the distance between the ends 20 and 21. Similarly, the shaft of the fine resolver 47 is connected through a gear box 51 to be rotated in response to the movement of the chain 20 revolutions for each revolution of the shaft of the coarse resolver 46.

A sin/cos generator circuit module 52, which is controlled by the timing module 42, supplies one of the input windings of the resolvers 44 and 45 with a 500 HZ sine wave input that is in phase with the 500 HZ reference sine wave input to the counters 38 and 39 and the other of the pair of input windings of the resolvers 44 and 45 with a 500 HZ sine wave of equal amplitude, but lagging the reference sine wave by 90° (cos). With this excitation, the outputs of the resolvers 44 and 45 will vary in phase relative to the reference sine wave with the position of their respective shafts. The 500 HZ sine wave output of the resolver 44 is supplied as an input through a lead 53 to one of the windings of the resolver 46 and is integrated by an integrator circuit module 54 and supplied to the other input winding of the resolver 46 as a 500 HZ sine wave of equal amplitude, but lagging in phase by 90° (cos) with the excitation voltage supplied by the lead 53. Similarly, the 500 HZ sine wave output of the resolver 45 is supplied as an input through a lead 55 to one of the pair of input windings of the resolver 47 and is integrated by a circuit module 56 and supplied to the other input of the winding of the resolver 47 as a 500 HZ sine wave of equal amplitude but lagging in phase by 90° (cos) with the excitation voltage supplied by the lead 55.

The 500 HZ sine wave outputs from the resolvers 46 and 47 are respectively amplified, clamped and rectified by circuits within switch modules 57 and 58 to appear as a pulse train that is similar to the outputs of the coarse command counter 38 and the fine command counter 39. The outputs of the switch modules 57 and 58, which are respectively called a coarse feedback signal CFB and a fine feedback signal FFB, are supplied as inputs to a coarse comparator module 59 and a fine comparator module 60, which also respectively receive inputs from the coarse command counter 38 and the fine command counter 39.

The output of the coarse command counter 38, hereinafter referred to as a coarse command signal CC, is a logic 1 to 0 transition at the trailing edge of each cycle of the 500 HZ voltage wave. The 1 to 0 signal change can be made to occur at any one of 1,000 different instants during each cycle of the 500 HZ reference voltage wave so that the coarse command counter 38 can be programmed to provide 1,000 distinct coarse command signals for each revolution of the coarse resolver 44 or 46. Similarly, the fine command counter 39 can be programmed to provide 1,000 distinct command 1 to 0 logic signals, or fine command signals FC, for every 1/20 revolution of the coarse resolver 44 or 46. Therefore, if it is assumed that the total distance between the ends 20 and 21 is 200 inches and both the machine 10 and the truck 13 are capable of moving 200 inches, then the relative range of movement between the workpieces 11 and 12 and the electrodes 29 will be 400 inches. Thus as the coarse command counter 38 is capable of providing 1,000 distinct coarse command signals over the entire range of movement (one revolu-tion of the coarse resolvers 44 and 46) which is 400 inches, and the fine command counter 39 is capable of providing 1,000 distinct fine command signals over 1/20 of the total range (20 inches), the linear axis will have a resolution of 0.02 inches and the system has the capability of being programmed to 20,000 distinct command positions within the 400 inch range of relative movement between the machine 10 and the truck 13.

As will be later described, the circuitry within the coarse comparator 59 compares the coarse feedback signal CFB with the coarse command signal CC and provides an output error signal to a switch module 61 which is dependent upon the order of occurrence and the time interval between the 1 to 0 change in the signals from the compared signals which will cause the motor 26 to be energized to rotate either in the forward or reverse directions, depending on the order of occurrence of the 1 to 0 signals at a predetermined rate when the time interval between the signals is greater than a preselected interval. Also, the fine comparator 60 compares the fine feedback signal FFB with the fine command signal FC and provides an output error signal to the switch module 61 which is dependent on the order of occurrence and the interval between the 1 to 0 change in the signals which it compares. The output error signal from the fine comparator 60 to the switch module 61 will cause the motor 26 to be energized to rotate in the forward or reverse directions depending upon the order of occurrence of the 1 to 0 signal changes of the compared signals at a rate dependent upon the magnitude of the interval between the signal change of the compared signals.

The output of the switch module 61 is supplied as an input to a deceleration module 62, which will be later described. The module 62 converts and modifies the output pulses from the switch module 61 to a positive or negative filtered D.C. voltage which is supplied as an input to a servo-drive amplifier 63 which in turn controls the energization of the motor 26. If desired, the drive amplifier 63 may also be furnished with an input signal from a tachometer 64 that is driven by the motor 26 to limit the energization of the motor 26.

The motor 26, when energized, will rotate the lead screw 24 through the gear box 25 to move the electrodes 29 which are supported by the base 22 and rotate the shafts of the resolvers 44 and 45 in a direction which will reduce the error signals as detected by the comparators 59 and 60. When the electrodes 29 are in their commanded position relative to the workpieces 11 and 12, the 1 to 0 signal changes of the coarse feedback signal CFB and the coarse command signal CC will be in phase and the 1 to 0 signal change of the fine feedback signal FFB will be in phase with the fine command signal FC which will cause the switch module 61 to supply an in position signal to the logic circuitry within an end of motion module 65. The module 65 in response to the in position input signal supplies a signal to the function module 40 which will initiate the operation of a weld sequence timer and cause the electrodes 29 to spot weld the workpieces 11 and 12 together. During the weld interval, when the spot weld is being formed, the workpieces 11 and 12 will be moving through the work station and the feedback outputs of the coarse and the fine resolvers 46 and 47 will be continuously changing. The fine comparator 60, in response to the changing fine feedback signal FFB, will provide an output through the circuits in the switch module 61 and the deceleration module 62, which causes the servo-drive amplifier 63 to provide the motor 26 with an energization that is exactly sufficient to move the machine 10 synchronously with the truck 13. The synchronous movement of the machine 10 causes the coarse and fine resolvers 44 and 45 to supply a changing input to the coarse and fine resolvers 46 and 47 which in turn reduces the changing coarse and fine feedback signal input to the comparators 59 and 60 so that the welding electrodes 29 remain in their programmed position as they are forming a spot weld between the workpieces 11 and 12.

The function module 40, at the end of the weld interval, will supply an input through the lead 66 to the sequence control module 33 which causes the sequence control module 33 to sequence the memory 31 and open the gates 35–37 to reprogram the coarse and the fine command counters 38 and 39, and the function module 40, so that the command counters 38 and 39 provide output command signals which will require the machine 10 to move to a new preprogrammed position relative to the workpieces 11 and 12. The coarse and fine comparators 59 and 60 in response to the changed coarse and fine command signal will provide an output signal which will cause the motor 26 to be energized to reduce the error signal in a manner previously described as the machine 10 moves to its newly commanded position relative to the workpieces 11 and 12.

At the end of the program, that is, when all the required spot welds have been made between the parts 11 and 12 at the positions dictated by the information stored within the memory 31, the end of program module 41 will supply a signal through a lead 67 to the switch modules 57 and 58. Also at the end of the program, the memory 31 will supply suitable inputs through the gates 35 and 36 to the coarse and fine command counters 38 and 39 which will cause the counters to supply coarse and fine command signals which will require the machine 10 to move upstream to its start position at the end 20 where it will await the entry of a subsequent truck 13 carrying unassembled workpieces into the work station. The circuitry within the switch modules 57 and 58 is arranged so that a signal input from the module 41 will cause the switch modules 57 and 58 to respond to the outputs of the resolvers 44 and 45 instead of the outputs from the resolvers 46 and 47 and permit the machine 10 to move independently of the chain 18 upstream to the end 20. During the movement of the machine 10 to the end 20, the truck 13 carrying the assembled workpieces will continue to move toward the end 21. The pin 17 is disengaged from the opening 16 when the truck 13 leaves the work station at the end 21, so that the chain 18 may be moved upstream and position the pin 17 at the end 20 where it will engage the opening 16 in a subsequent truck 13 as the subsequent truck 13 enters the work station.

The foregoing operation constitutes a description of the operation of the control system when the control module 32 is programmed so that the machine 10 will operate in the automatic mode. The indexing mode of operation is provided in the control system to check the information stored within the memory 31 during periods when the conveyor which moves the body truck 13 is stopped. The program within the memory 31 may be checked by merely pressing a button in the control module 32 which will cause the machine 10 to move from one preprogrammed position to its next programmed position and maintain its position until the indexing button is again depressed, which will sequence the memory 31 one step and require the machine 10 to move to a new position. Thus the machine 10 may be sequenced through its programmed steps to determine if the information within the memory 31 corresponds to a program which will locate the spot welds between the workpieces 11 and 12 at their desired locations.

A hold mode of operation is included in the control system to minimize damages which could occur in event an emergency should occur while the machine 10 is operating in its automatic mode and it becomes necessary to stop the conveyor line which moves the trucks 13. The hold mode of operation may be initiated at any time by activating a suitable hold switch in the control module 32. If the machine 10 is moving toward a new position on the workpieces 11 and 12, when the hold mode of operation is initiated, the coarse and fine command signals will be reset to correspond to the coarse and fine feedback signals, in a manner to be later described in detail, and the movement of the machine 10 will be synchronized with the movement of the conveyor as the conveyor coasts to a stop.

The initiation of the hold switch will cause the hold-jog module 34 to supply a signal for a brief time interval, i.e., 380 milliseconds, to the comparators 59 and 60 which will block the operation of the comparators 59 and 60 and cause the comparators 59 and 60 to supply a zero output error signal which will permit the motor 26 to decelerate. During the 380 millisecond time interval, the Hold-jog module 34, in response to feedback signals from the resolvers 46 and 47, will supply input signals to the counters 38 and 39 which will preset the counters 38 and 39 when the coarse and fine feedback signals change from 1 to 0 so that the coarse and the fine command signals will be in phase with the coarse and the fine feedback signals. The presetting of the counters 38 and 39 will occur approximately 190 times during the 380 millisecond interval after which the comparators 59 and 60 will cause the motor to be energized to an extent necessary to cause the machine 10 to move synchronously with the truck 13 as the truck 13 coasts to a stop.

The teach mode of operation is included in the control system to permit the machine 10 to be manually controlled in its movement to a variable number of discreet positions relative to the workpieces 11 and 12 to which the machine 10 can be later caused to move in automatic play-back mode. The operator's control module 32 is provided with a suitable switch which will cause the system to operate in the automatic or teach mode and job switches which, when operated, will energize the motor 26 to jog machine 10 in either a fast or slow jogging speed. The teach mode of operation may be initiated by activating the teach and jog switches in the control module 32. When the teach and jog switches are activated, the machine 10 will move to a desired position on the workpieces 11 and 12 and the jog-hold circuit will operate in a manner which will be later described. During the movement of the machine 10 in the jogging mode, the coarse and fine command signals will be preset to correspond to the coarse and fine feedback signals. When the machine 10 is in its desired position, and a suitable second switch within the control module 32 is activated, the information which is stored within the coarse and fine counters 38 and 39 will be transferred into one bank of the memory 31. When the machine 10 is again jogged to a new position, the coarse and fine command signals again will be preset to correspond to the coarse and fine feedback signals so that the information which corresponds to the new position may be transferred out of the command counters 38 and 39 into the next sequenced bank of the memory 31. The movement of the machine 10 to any number of desired locations is repeated until the desired number of spot weld locations are recorded in the memory 31.

When the jog switches are operated in the control module 32, the jog hold circuit 34 will supply a suitable input to the switch module 61 which will cause the drive motor 26 to rotate in either the forward or reverse direction at either a fast or slow speed, depending upon the actuation of the jog switches. The circuitry within the jog-hold module 34 is arranged so that the rotation of the motor 26 progressively increases to the selected jog speed when the jog switch is initially actuated and abruptly reduced when the jog switch is deactivated to aid in the accurate positioning of the electrodes 29 on workpieces 11 and 12.

The circuits as shown in the drawings includes a plurality of solid state logic units designated as NANDS, ANDS, NORS and JK type flip flops, all of which are well known to those skilled in the art, and provide outputs in response to inputs as follows. A NAND provides a Boolean logic operation which yields a logic 0 output when all of its logic input signals are logic 1 and a logic 1 output when any of its logic input signals are logic 0. An AND provides a Boolean logic operation which yields a logic 1 output when all its logic input signals are logic 1 and a logic 0 output when any of its logic input signals are logic 0. A NOR provides a Boolean logic operation which yields a logic 1 output when all of its logic input signals are logic 0 and a logic 0 output when any of its logic input signals are logic 1. A flip flop is a circuit that has two stable states and the capability of changing from one state to another with the application of a control signal and remaining in that state after removal of the signals. A JK flip flop is a flip flop having two inputs designated as J and K and a toggle designated as T which, upon a logic 1 to 0 change at its toggle T with a logic 1 on its J input and a logic 0 on the K input, will set the flip flop in the ON state and with a logic 0 on its J input and a logic 1 on the K input will set the flip flop in its OFF state. The JK flip flops as used herein also include a set input designated by a letter S which is not controlled by the signals appearing at the toggle T and will switch the flip flop to its ON state in response to a logic 0 signal at its set input S. A JK flip flop, when in the ON state, will supply a 1 at its E output and a 0 at its $\overline{E}$ output. When in the OFF state, a JK flip flop will supply a 0 at its E output and a 1 at its $\overline{E}$ output.

Figure 2:
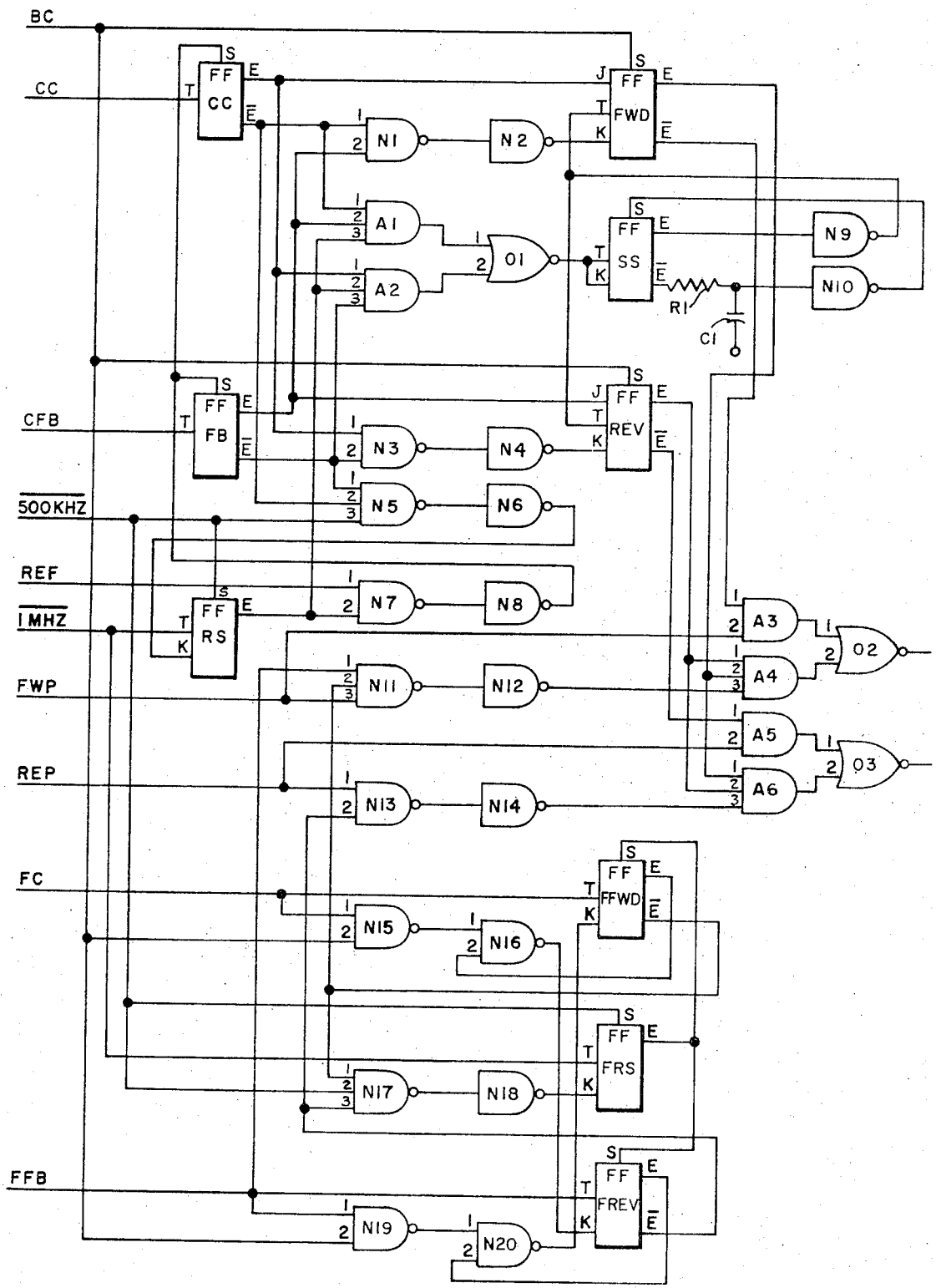
FIG. 2 is a schematic and block diagram of the circuitry used to compare the outputs of the position detecting resolvers and the command position signal provided by the components in FIG. 1.

The coarse comparator circuit, shown in FIG. 2 and designated as 59 in FIG. 1, includes a coarse command flip flop CC, a feedback flip flop FB, a reset flip flop RS, a flip flop FWD designated as a forward flip flop, a flip flop REV designated as a reverse flip flop, a flip flop SS designated as the single shot flip flop, NANDS N1–N10, ANDS A1–A2, and a NOR 01. The coarse comparator circuit receives input signals from the coarse command counter 38, the resolver 46 and the timing module 42, illustrated in FIG. 1, as are typically illustrated by the curves in FIG. 3. The coarse command counter provides the coarse command signal CC, the resolver 46 provides the coarse feedback signal CFB and the timing module 42 provides the signals 500 KHZ, REF and 1MHZ. The forward FWD and reverse REV flip flops have their outputs E and $\overline{E}$ connected to supply inputs to ANDS A3–A6 which in turn provide inputs to a pair of NORS 02 and 03.

The fine comparator circuit includes a flip flop FFWD which is designated as the fine forward flip flop, a flip flop FREV which is designated as the fine reverse flip flop, a flip flop FRS which acts as a fine reset flip flop, and NANDS which are designated as N11–N20. The fine comparator circuit receives inputs from the fine command counter 39, the resolver 47 and the timing module 42 shown in FIG. 1. The fine command counter provides the fine command signal FC, the resolver 47 provides the fine feedback signal FFB and the module 42 provides the signals 500 KHZ and 1MHZ. The signals FWP and REP are synchronized with the fine command signal FC.

COARSE COMPARATOR CIRCUIT

The NAND N7 has an input 1 connected to the signal source REF and an input 2 connected to an output E of the flip flop RS. The flip flop RS is turned ON by a 0 input from the 500 KHZ signal on its input S. In its ON state, the flip flop RS supplies a 1 signal at its output E. The source REF supplies a 0 signal pulse that has a 500 nanosecond duration at a rate of 500 cycles per second. Thus every 500 cycles the output of the NAND N7 switches to provide a 500 nanosecond 0 to 1 signal pulse which is inverted by a NAND N8 and supplied as a 1 to 0 input to the inputs S of the flip flop CC and the flip flop FB respectively, so the flip flops CC and FB are turned ON and respectively supply a 1 signal at their outputs E and a 0 signal at their outputs $\overline{E}$. The flip flop CC has its toggle T connected to receive a coarse command input signal CC and is switched to an OFF state upon a 1 to 0 change in the signal CC. Similarly, the flip flop FB has its toggle connected to receive the coarse feedback signal CFB and is switched to an OFF state upon a 1 to 0 change in the signal CFB. The difference in time of occurrence of a 1 to 0 signal change of the coarse command signal CC and the coarse feedback signal CFB will provide an error signal which is indicative of both the direction and the distance which the coarse feedback resolver 46 must be rotated to reduce the error signal.

Figure 3:
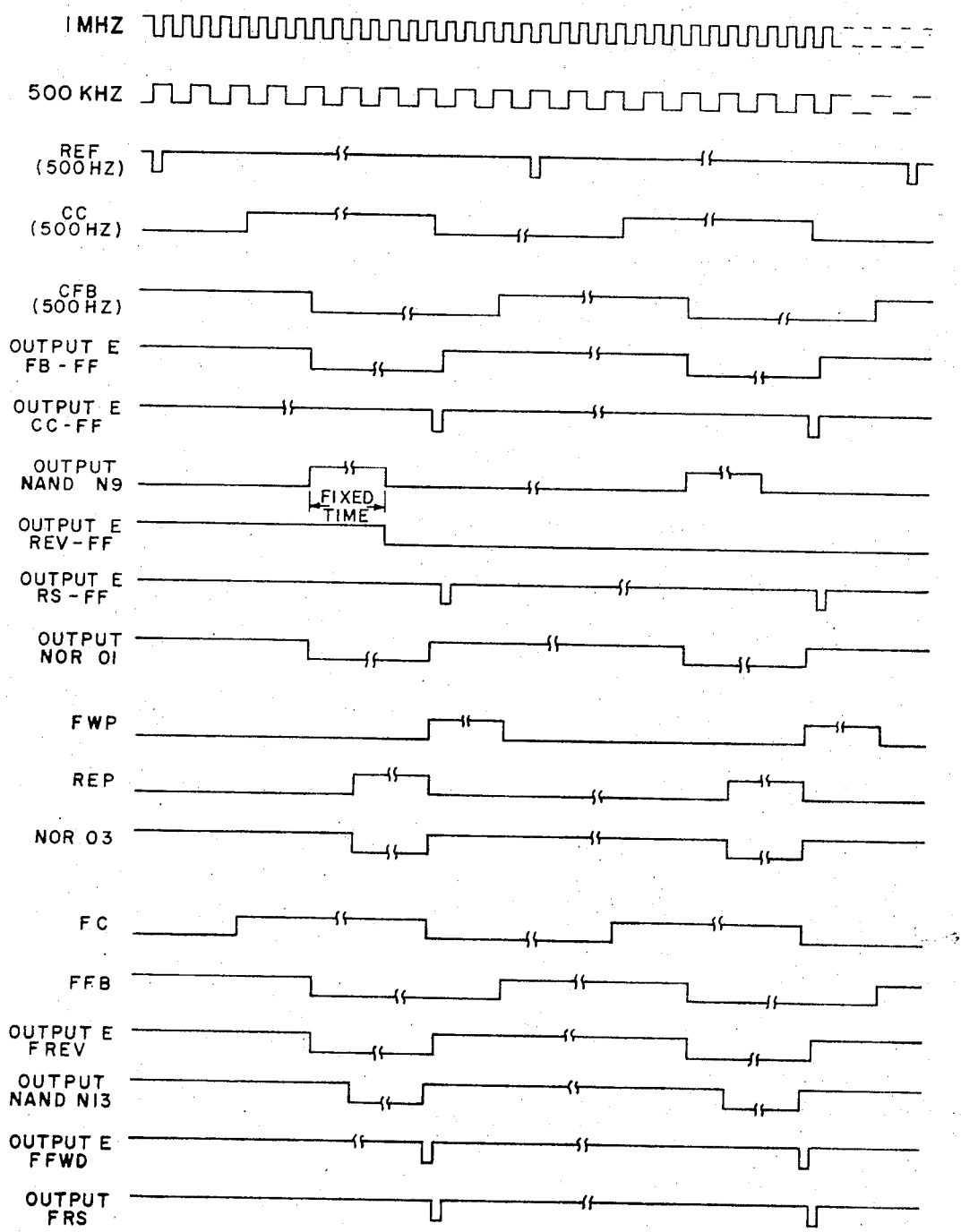
FIG. 3 is a graphical representation showing the time relationships of signals in the circuit shown in FIG. 2.

If the machine 10 is positioned so that the coarse feedback signal CFB changes from 1 to 0 prior to a 1 to 0 change in the coarse command signal CC, the control will operate to rotate the resolver 46 in a direction to reduce the error signal which, for purposes of description, is designated as a reverse direction REV. Similarly, if the coarse command signal CC changes from 1 to 0 prior to a change of 1 to 0 of the coarse feedback signal CFB, the control will operate to reduce the error signal and drive the resolver 46 in a forward direction FWD. In FIG. 3, the curves indicate the signals appearing at the inputs and outputs of the designated solid state components relative to a train of 500 nanosecond 0 pulses on a 500 cycles per second reference wave REF, when the control is programmed so the coarse feedback signal CFB changes from 1 to 0 prior to a change of 1 to 0 of the coarse command signal CC.

The 1 to 0 signal change of the coarse feedback signal CFB to the toggle T of the flip flop FB causes the flip flop FB to switch OFF and a 1 signal to appear at its output $\overline{E}$ and a 0 signal at its output E. The 1 signal at output $\overline{E}$ of the flip flop FB is supplied to an input 2 of the NAND N3, an input 1 of the NAND N5 and an input 3 of the AND A2. The 0 signal at output E of the flip flop FB is supplied to the J input of the flip flop REV, an input 2 of the AND A1, and an input 2 of the NAND N1. The NAND N3 through its input 1 also receives an input of 1 from the output E of the flip flop CC which remains in its ON state because the coarse command signal CC on its toggle T has not changed from 1 to 0. Thus as both inputs 1 and 2 of the NAND N3 are 1, the output of the NAND N3 switches to 0. The 0 output of the NAND N3 is inverted by a NAND N4 and is supplied as a 1 to the K input of the flip flop REV to condition the flip flop REV to switch to an OFF state upon the receipt of a 1 to 0 signal change at its toggle T input. The AND A2 also receives a 1 signal at its input 2 from the flip flop RS output E and a 1 signal at its input 1 from the output E of the flip flop CC. As all of the inputs to the AND A2 are now 1, it switches its output to supply a 1 input to the NOR 01 which switches its output from 1 to 0.

The output of the NOR 01 is supplied as a 1 to 0 input signal change to the toggle T and the K input of the flip flop SS. The flip flop SS, in response to the 1 to 0 output signal change of the NOR 01, switches to an OFF state so that a 0 signal appears at its output E and a 1 signal appears at its output $\overline{E}$. The 1 to 0 signal change at the output E of the flip flop SS is inverted by the NAND N9 and supplied as a 0 to 1 signal input change to the toggles T of the flip flops FWD and REV.

During the interval when the flip flop SS is switched ON and its output $\overline{E}$ provides a 0 signal, the NAND N10 supplies a 1 signal to the input S of the flip flop SS so that the flip flop SS is conditioned to switch to an OFF state upon the receipt of a 1 to 0 input signal change at its toggle T and its input K. The switching of the flip flop SS to an OFF state causes the signal at its output $\overline{E}$ to change from 0 to 1. This 0 to 1 signal change is delayed in its transmission to the input of the NAND N10 by a capacitor C1 and a resistor R1 so that the NAND N10 continues to supply a 1 signal to the input S of the flip flop SS after the flip flop SS has switched to an OFF state. After a fixed time delay, as determined by the RC constants of the resistor R1 and the capacitor C1, the charge on the capacitor C1 increases to a value which causes the NAND N10 to switch and supply a 0 input signal to the input S of the flip flop SS. The 0 input signal to the input S of the flip flop SS causes the flip flop SS to switch to an ON state and the output of the NAND N9 to switch from 1 to 0. The output of the NAND N9 is connected to the toggles T of the flip flops FWD and REV. Thus if the coarse command signal CC has not changed from 1 to 0 prior to the 1 to 0 signal change from the NAND N9, the flip flop FWD will remain ON and the flip flop REV will switch to an OFF state because of the 1 input signal at its K input and supply a 1 signal at its output $\bar{E}$ and a 0 signal at its output E.

As shown in FIG. 3, subsequent to the switching OFF of the flip flop REV and prior to the receipt of the signal change from the signal source REF, the coarse command signal CC changes from 1 to 0.

The 1 to 0 change of the coarse command signal CC to the toggle T of the flip flop CC causes the flip flop CC to switch OFF so that a 1 signal appears at its output $\bar{E}$ and a 0 signal at its output E. The 1 signal at the output $\bar{E}$ of the flip flop CC is supplied to the input 2 of the NAND N5 which also receives a 1 input from the flip flop FB at its input 1 so that the NAND N5 is conditioned to switch when the 500 KHZ signal at its input 3 switches to 1. When all of the inputs 1, 2 and 3 of the NAND N5 are 1, its output switches to 0. The 0 output of the NAND N5 is inverted by the NAND N6 and supplied as a 1 to the K input of the flip flop RS which switches to an OFF state upon the receipt of a subsequent 1 to 0 signal change to its toggle T in the 1MHZ signal. The flip flop RS when in an OFF state switches the flip flops CC and FB to their ON states and supplies a 0 signal to the input 2 of the AND 2 which causes the output of the AND A2 to switch from 1 to 0. The 0 output of the AND A2 causes the output of the NOR 01 and the input to the toggle T of the flip flop SS to change from 0 to 1 to condition the flip flop SS for switching from its ON to its OFF state when the signal at its toggle T again switches from 1 to 0 as previously described. The 1 from the 500 KHZ signal, which caused the NAND N5 to switch and supply a 0 output signal, is also supplied to the input S of the flip flop RS. Therefore when the 500 KHZ signal switches from 1 to 0 subsequent to the switching of the NAND N5, the flip flop RS will switch to its ON state.

Summarizing the foregoing, the switching of the flip flop FB in response to the 1 to 0 change in the coarse feedback signal CFB causes a 1 to be supplied to the K input of the flip flop REV and a 1 to 0 signal change to be supplied to the toggle T of the flip flop SS. The flip flop SS, resistor R1, capacitor C1 and the NAND N10 function as a single shot circuit and after a fixed time delay provide a 1 to 0 signal change to the toggles T of the flip flops FWD and REV. If the time delay provided by the single shot circuit is less than the time interval of the error signal, e.g., the interval between the 1 to 0 change in the coarse feedback signal CFB and the 1 to 0 change in the coarse command signal CC, the 1 to 0 signal change to the toggle T of the flip flop FWD will not change the ON state of the flip flop FWD because of the continuing 0 that is supplied by the output $\bar{E}$ of the flip flop CC to the input K of the flip flop FWD. The 1 to 0 signal change to the toggle T of the flip flop REV however causes the flip flop REV to switch OFF because of the 1 input to its K input. The flip flop REV when OFF supplies a 0 at its output E and a 1 at its output $\bar{E}$ and remains OFF as long as the duration of the error signal is greater than the fixed time delay provided by the single shot circuit.

The ANDS A3–A6 and the NORS 02 and 03 function as the switch 61 in FIG. 1 as follows. The outputs $\bar{E}$ of the respective flip flops FWD and REV are respectively connected to the inputs 1 of ANDS A3 and A5. The output E of the flip flop FWD is connected to an input 2 of an AND A4 and an input 1 of an AND A6. The output E of the flip flop REV is connected to an input 1 of an AND A4 and an input 2 of an AND A6. The ANDS A3 and A4 have their outputs connected to the inputs 1 and 2 of a NOR 02 which has its output connected through a digital to analog converter in the deceleration module 62 in FIG. 1 to control the energization of a motor 26 in a manner which will drive the position resolvers 44 and 45 in the forward direction. Similarly, the ANDS A5 and A6 have their outputs connected to the inputs 1 and 2 of a NOR 03 which has its output connected through the deceleration module 62 to control the energization of a motor 26 in a manner which will drive the position resolvers 44 and 45 in a reverse direction. When both flip flops FWD and REV are ON, the 1 signals appearing at their respective outputs E will appear as a 1 signal at the inputs of the respective ANDS A4 and A6 so the ANDS A4 and A6 are respectively controlled by signals appearing at their inputs 3 during fine positioning, as will be later described. Further, when both flip flops FWD and REV are ON, the 0 signals appearing at their respective outputs $\bar{E}$ will cause the ANDS A3 and A5 to have 0 outputs which permit the NORS 02 and 03 to be controlled by the outputs of the ANDS A4 and A6.

The flip flop REV, when in an OFF state, supplies a 0 signal at its output E and a 1 signal at its output $\bar{E}$. The 0 signal at the output E thereby blocks the switching of the ANDS A4 and A6 in response to the signals from the fine positioning control, as will be later described. The 1 signal from the output $\bar{E}$ of the flip flop REV is supplied to an input 1 of the AND A5 which also receives a signal at its input 2 from the signal source REP. The source REP supplies a signal that is 1 during 20 percent of each cycle of the 500 cycle/sec reference wave and 0 during the remainder of each cycle. Thus the NOR 03 will have a 0 output for 20 percent of the time and energize the motor 26 to drive the motor 26 in the reverse direction to reduce the time duration of the error signal.

FINE COMPARATOR CIRCUIT

The solid state logic units in the fine comparator circuit 60 will exist in the following states when the fine comparator circuit 60 is reset. The flip flop FFWD, the flip flop FREV and the flip flop FRS will be ON and provide a logic 1 at their respective E terminals and a logic 0 at their $\bar{E}$ terminals. The fine command signal FC and the fine feedback signal FFB will each provide a logic 1 signal to the fine comparator circuit 60. The 1 signal from the fine command signal FC is supplied to the toggle T of the flip flop FFWD and causes the NAND N15 to have a 0 output which is inverted by the NAND N16 and supplied as a 1 to the K input of the flip flop FREV. The logic 1 from the fine feedback signal FFB, which is supplied to the toggle T of the flip flop FREV, causes the NAND N19 to have a 0 output which is inverted by the NAND N20 and supplied as a 1 to the K input of the flip flop FFWD. The 0 output at the $\bar{E}$ output of the flip flop FFWD is supplied to the input 2 of the NAND N11 and to the 1 input of the NAND N17 so that the NANDS N11 and N17 will have a continuing 1 output. The 0 output at the $\bar{E}$ output of the flip flop FREV is supplied to an input 3 of the NAND N17 and an input 2 of the NAND N13 so that the NANDS N13 and N17 provide a continuing 1 output. The continuing 1 outputs from the NANDS N11 and N13 are inverted by the NANDS N12 and N14 respectively and supplied to the inputs 3 of the ANDS A4 and A6 respectively, so that the NORS 02 and 03 have a continuing 1 output. The output E of the flip flop FRS is supplied as a 1 to the inputs S of the flip flop FFWD and the flip flop FREV. During the operation of the fine comparator circuit 60, the ANDS A3 and A5 supply a continuous 1 to the inputs 1 of the NORS 02 and 03 respectively.

If the control is programmed so that the fine feedback signal FFB changes from 1 to 0 prior to a change from 1 to 0 in the fine command signal FC, the control will operate to rotate the fine feedback resolver in a direction to reduce the error signal which, for purposes of description, is designated as the reverse direction. Similarly, if the signal from the fine command signal FC changes from 1 to 0 prior to a change of 1 to 0 in the fine feedback signal FFB, the control will operate to reduce the error signal and drive the fine feedback resolver in a forward direction. In FIG. 3 the curves indicate the signals appearing at the inputs and outputs from the sources indicated and the designated solid components when the machine 10 is positioned so that the fine feedback signal FFB changes from 1 to 0 prior to a change of 1 to 0 of the fine command signal FC. The continuing 1 fine command signal through the NANDS N15 and N16 causes a 1 signal input to be present at the K input of the flip flop FREV so that the change of 1 to 0 in the fine feedback signal FFB, at the toggle T of the flip flop FREV, causes the flip flop FREV to switch OFF and supply a 0 signal at its E output and a 1 signal at its $\overline{E}$ output.

The 1 to 0 change of the signal from the fine feedback signal FFB also causes the NAND N19 to supply a 1 to an input 1 of the NAND N20. However, the NAND N20 continues to supply a 1 to the K input of the flip flop FFWD as the NAND N20 now receives a 0 at its input 2 from the E output of the flip flop FREV. The 1 at the output $\overline{E}$ of the flip flop FREV is supplied to an input 3 of the NAND N17 and an input 2 of the NAND N13. The output of the NAND N17 does not switch in response to the 1 at its input 3 because it continues to receive a 0 at its input 1 from the output $\overline{E}$ of the flip flop FFWD so that the flip flop FRS remains in its ON state. The 1 to the input of the NAND N13 permits the state of the NAND N13 to be controlled by the signals from the source REP, which, as shown in FIG. 3, switches from a 0 to 1 72° prior to the switching of the signal from the fine command signal FC from 1 to 0 so that the signal from the source REP is 1 during 20 percent of each cycle of the fine command signal FC. Thus 72° prior to the signal change in the fine command signal FC, the NAND N13 has a 1 on both of its inputs 1 and 2 and thereby supplies a 0 input to the NAND N14 which in response thereto supplies a 1 to the input 3 of the AND A6. As previously described, the AND A6 also receives a 1 at its inputs 1 and 2 from the E outputs of the flip flops FWD and REV. Thus the output of the AND A6 switches to a 1 which causes the NOR 03 to supply a 0 signal to the deceleration module 62 which will control the energization of a motor 26 in a manner which will drive the position resolvers 44 and 45 in a reverse direction to reduce the error signal. As shown in FIG. 3, subsequent to the change of the signal from 0 to 1 of the source REP, the fine command signal FC switches from 1 to 0. The 1 to 0 change of the fine command signal FC, which is supplied to the toggle T of the flip flop FFWD, causes the flip flop FFWD to switch so that a 1 signal appears at its output $\overline{E}$ and a 0 signal at its output E.

The 1 to 0 change in the fine command signal FC also causes the NAND N15 to supply a 1 to the input 1 of the NAND N16. However, the NAND N16 continues to supply a 1 to the K input of the flip flop FREV as the NAND N16 now receives a 0 at its input 2 from the E output of the flip flop FFWD. The 1 at the output $\overline{E}$ of the flip flop FFWD is supplied to an input 1 of the NAND N17 and an input 2 of the NAND N11 so that the NAND N17 now receives a 1 at each of its inputs 1 and 3 and is conditioned to be switched by the 500 KHZ signals. The 500 KHZ signal is supplied to both the input 2 of the NAND N17 and the input S of the flip flop FRS. Thus during the half cycle when the 500 KHZ signal is 1, the input S of the flip flop FRS will be 1 and the output of the NAND N17 will be 0. The NAND N18 inverts the 0 output of the NAND N17 and supplies a 1 to the K input of the flip flop FRS which switches to an OFF state when the signal at its toggle T from the 1MHZ signal switches from 1 to 0. The switching to the ON state of the flip flop FRS causes the signal at its E output to change from 1 to 0 and is supplied to the input S of both the flip flops FFWD and FREV. The flip flops FFWD and FREV in response to the 0 signals at their inputs S switch to an ON state and respectively supply a 1 to the inputs 2 of the NANDS N16 and N20 so that the NANDS N16 and N20 now supply a 0 to the K inputs of the flip flops FFWD and FREV. The flip flops FFWD and FREV when in the ON state also supply a 0 to the inputs 1 and 3 of the NAND N17 which in response thereto through NAND N18 supplies a 0 to the input K of the flip flop FRS which causes the flip flop FRS to remain in its ON state after it is turned ON by a 0 pulse at its input S from the 500 KHZ signal on the subsequent change of the 1MHZ signal at its toggle T. Thus the flip flops FFWD, FRS, and FREV are all in the ON state so that a subsequent change in the fine feedback signal FFB and the fine command signals from 0 to 1 will cause the NANDS N20 and N16 to respectively supply a 1 to the inputs K of the flip flops FFWD and FREV and restore the circuit to its reset state as previously described.

In view of the foregoing, it is obvious that if the machine 10 is positioned so that the coarse command signal CC changes from 1 to 0 prior to a 1 to 0 change in the coarse feedback signal CFB, the control will operate to rotate the resolvers 44 and 45 in a direction to reduce the error signal which, for purposes of description, is designated as the forward direction FWD, in a manner which may be summarized as follows. The flip flop CC will switch OFF in response to the 1 to 0 change in the coarse command signal CC and cause a 1 to be supplied to the K input of the flip flop FWD and a 1 to 0 signal change to be applied to the toggle of the flip flop SS. The flip flop SS, resistor R1, capacitor C1 and the NAND N10 function as a single shot circuit and after a fixed time delay provide a 1 to 0 signal change to the toggles T of the flip flops FWD and REV. If the time delay provided by the single shot circuit is less than the time delay interval of the error signal, e.g., the interval between 1 to 0 change of the coarse command signal and the 1 to 0 change in the coarse feedback signal CFB, the 1 to 0 change to the toggle of the flip flop REV will not change the ON state of the flip flop REV because of the continuing 0 that is applied by the output E̅ of the flip flop FB to the input K of the flip flop REV. The 1 to 0 signal change to the toggle of the flip flop FWD however causes the flip flop FWD to switch OFF because of the 1 input to its K input. The flip flop FWD when OFF supplies a 0 at its output E and a 1 at its output E̅ and remains OFF as long as the duration of the error signal is greater than the fixed time delay provided by the single shot circuit.

The flip flop FWD when in the OFF state, supplies a 0 signal at its output E and a 1 signal at its output E̅. The 0 signal at the output E thereby blocks the switching of the ANDS A4 and A6 in response to the signals from the fine positioning control. The 1 signal at the output E̅ of the flip flop FWD is supplied to the 1 input of the AND A3 which also receives a signal at its input 2 from the signal source FWP. The source FWP supplies a signal that is 1 during 20 percent of each cycle of the 500 cycle reference wave after the coarse command signal CC changes from 1 to 0, and 0 during the remainder of the cycle. Thus the NOR 02 will have a 0 output for 20 percent of the time and energize the motor 26 to drive the motor 26 at a constant speed in the forward direction to reduce the time duration of the error signal.

If the control is programmed so that the signal from the fine command signal FC changes from 1 to 0 prior to a change of 1 to 0 in the fine feedback signal FFB, the control will operate to reduce the error signal and drive the fine feedback resolver in a forward direction.

The 1 to 0 change of the signal from the fine command signal FC also causes the NAND N15 to supply a 1 to an input 1 of the NAND N16. However, the NAND N16 continues to supply a 1 to the K input of the flip flop FREV as the NAND N16 now receives a 0 at its input 2 from the E output of the flip flop FFWD. The 1 at the output E̅ of the flip flop FFWD is supplied to an input 1 of the NAND N17 and an input 2 of the NAND N11. The output of the NAND N17 does not switch in response to the 1 at its input 1 because it continues to receive a 0 at its input 3 from the output E̅ of the flip flop FREV so that the flip flop FRS remains in its ON state. The 1 to the input of the NAND N11 permits the state of the NAND N11 to be controlled by the signals from the source FWP which exists as a 1 for 72° after the fine command signal FC switches from 1 to 0 so that the signal from the source FWP is 1 during 20 percent of each cycle. Thus during an interval of 72° after the fine command signal has change to 0, the NAND N11 has a 1 on all of its inputs and thereby supplies a 1 to the input 3 of the AND A4. As previously described, the AND A4 also receives a 1 at its inputs 1 and 2 from the E outputs of the flip flops FWD and REV. Thus the output of the AND A4 switches to a 1 which causes the NOR 02 to supply a 0 signal to the deceleration circuit 62 which will control the energization of a motor 26 in a manner which will drive the position resolver 45 in a forward direction to reduce the error signal. As shown in FIG. 3, subsequent to the change of the signal from 1 to 0 of the source FWP, the fine feedback signal FFB switches from 1 to 0. The 1 to 0 change of the fine feedback signal FFB, which is supplied to the toggle T of the flip flop FREV, causes the flip flop FREV to switch so that a 1 signal appears at its output E̅ and a 0 signal at its output E.

The 1 to 0 change in the fine feedback signal FFB also causes the NAND N19 to supply a 1 to the input 1 of the NAND N20. However, the NAND N20 continues to supply a 1 to the K input of the flip flop FFWD as the NAND N20 now receives a 0 at its input 2 from the E output of the flip flop FREV. The 1 at the output E̅ of the flip flop FREV is supplied to an input 3 of the NAND N17 and an input 2 of the NAND N13 so that the NAND N17 now receives a 1 at each of its inputs 1 and 3 and is conditioned to be switched by the 500 KHZ signals. The 500 KHZ signal is supplied to both the input 2 of the NAND N17 and the input S of the flip flop FRS. Thus during the half cycle when the 500 KHZ signal is 1, the input S of the flip flop FRS will be 1 and the output of the NAND N17 will be 0. The NAND N18 inverts the 0 output of the NAND N17 and supplies a 1 to the K input of the flip flop FRS which switches to an OFF state when the signal at its toggle T from the 1MHZ signal switches from 1 to 0. The switching to the OFF state of the flip flop FRS causes the signal at its E output to change from 1 to 0 and is supplied to the input S of both the flip flops FFWD and FREV. The flip flops FFWD and FREV in response to the 0 signals at their inputs S switch to an ON state and respectively supply a 1 to the inputs 2 of the NANDS N16 and N20 so that the NANDS N16 and N20 now supply a 0 to the K inputs of the flip flops FFWD and FREV. The flip flops FFWD and FREV when in the ON state also supply a 0 to the inputs 1 and 3 of the NAND N17 which in response thereto through NAND N18 supplies a 0 to the input K of the flip flop FRS which causes the flip flop FRS to remain in its ON state after it is turned ON by a 0 pulse at its input S from the 500 KHZ signal on the subsequent change of the 1 to 0 of the 1 MHZ signal at its toggle T. Thus the flip flops FFWD, FRS, and FREV are all in the reset state. Subsequent to the resetting of the flip flops FFWD, FRS and FREV, the fine command signal FC and the fine feedback signal FFB will change from 0 to 1 and cause the NANDS N20 and N16 to respectively supply a 1 to the inputs K of the flip flops FFWD and FREV so as to restore the circuit to its reset state, as previously described.

Thus when the interval between the occurrence of the coarse command and feedback signals is greater than the time interval as dictated by the single shot circuit that includes the flip flop SS, the motor 26 will be energized with constant current to operate either in the forward or the reverse directions because of the 20 percent ON time signal pulses provided by the sources FWP and REP. The cross-over at which the control of the energization of the motor 26 is transferred from a control by the coarse feedback signal to the fine feedback signal occurs when the time interval between the coarse feedback and command signals is less than the time interval as dictated by the switching of the single shot circuit, including the flip flop SS. If the 1 to 0 signal changes in the coarse feedback and coarse command signals CFB and CC occur before the single shot circuit, including the flip flop SS, times out, a 0 will be present at the E outputs of the flip flops CC and FB before the signals at the toggles T of the flip flop FWD and REV changes from 1 to 0 in response to the change in the output of the NAND N10, as previously described. The 0 at the $\overline{E}$ output of the flip flops CC and FB respectively will cause the K inputs of the flip flops REV and FWD respectively to be 0 when the signal input to the respective toggles changes from 1 to 0 so that neither of the flip flops FWD or REV will switch OFF to cause the motor to be energized.

The flip flops FWD and REV, when in the ON state, will permit the ANDS A4 and A6 to be controlled by the signals in the fine comparator circuit. The crossover from the control in response to the coarse feedback signal to the fine feedback signal is made to occur when the linear axis is approximately 5 inches from the desired position, or where the coarse error is equivalent to 12 coarse counts by the interval provided by the timing circuit including the flip flop SS. During positioning in response to the coarse error signal, the ANDS A3 or A5 will cause the deceleration module 62 to be supplied with a signal that is ON 20 percent of the time and OFF 80 percent of the time, regardless of the magnitude of the position error. When the control is switched to respond to the fine feedback signal, the sources FWP and REP will cause the ANDS A4 or A6 to supply the deceleration module 62 with a signal that is on 20 percent of the time and OFF 80 percent of the time. Thus the energization of the motor will not change during cross-over from positioning in response to the coarse error signal to positioning in response to the fine error signal. When the fine error signal becomes less than 200 counts, the deceleration module 62 will cause the energization of the motor 26 to be progressively decreased in response to a progressively decreasing fine error signal as the machine moves into its preprogrammed position relative to the workpieces 11 and 12.

The reference signal REF appears as a 500 nanosecond pulse which is generated by the 500 HZ voltage wave as the polarity of the voltage changes from positive to negative. The signal REF is used to reset the counters 38 and 39. The 500 HZ reference voltage provides the inputs to the resolvers 44 and 45 and the resolvers 44–47 are adjusted to have their outputs in phase with the coarse and fine command signals when the pin and the machine 10 are at the end position 20 and the coarse and fine command counters 39 and 38 provide command signals of 500 HZ. Thus if a position equivalent to a count less than 500 is required, i.e., 250, the machine 10 will tend to move upstream. However, other switching circuits, not shown, will prevent the machine 10 from moving upstream beyond the position 20 so the machine 10 will wait at the end 20 until the pin 17 is moved the required 250 units distance into the work station. If the next required position requires a count of 350, the machine 10 will move downstream the required distance to satisfy the 350 count. Finally, if the next required position requires a count of 100, the machine 10 will move upstream the required distance to satisfy the 100 count.

HOLD-JOG CIRCUIT

Figure 4:
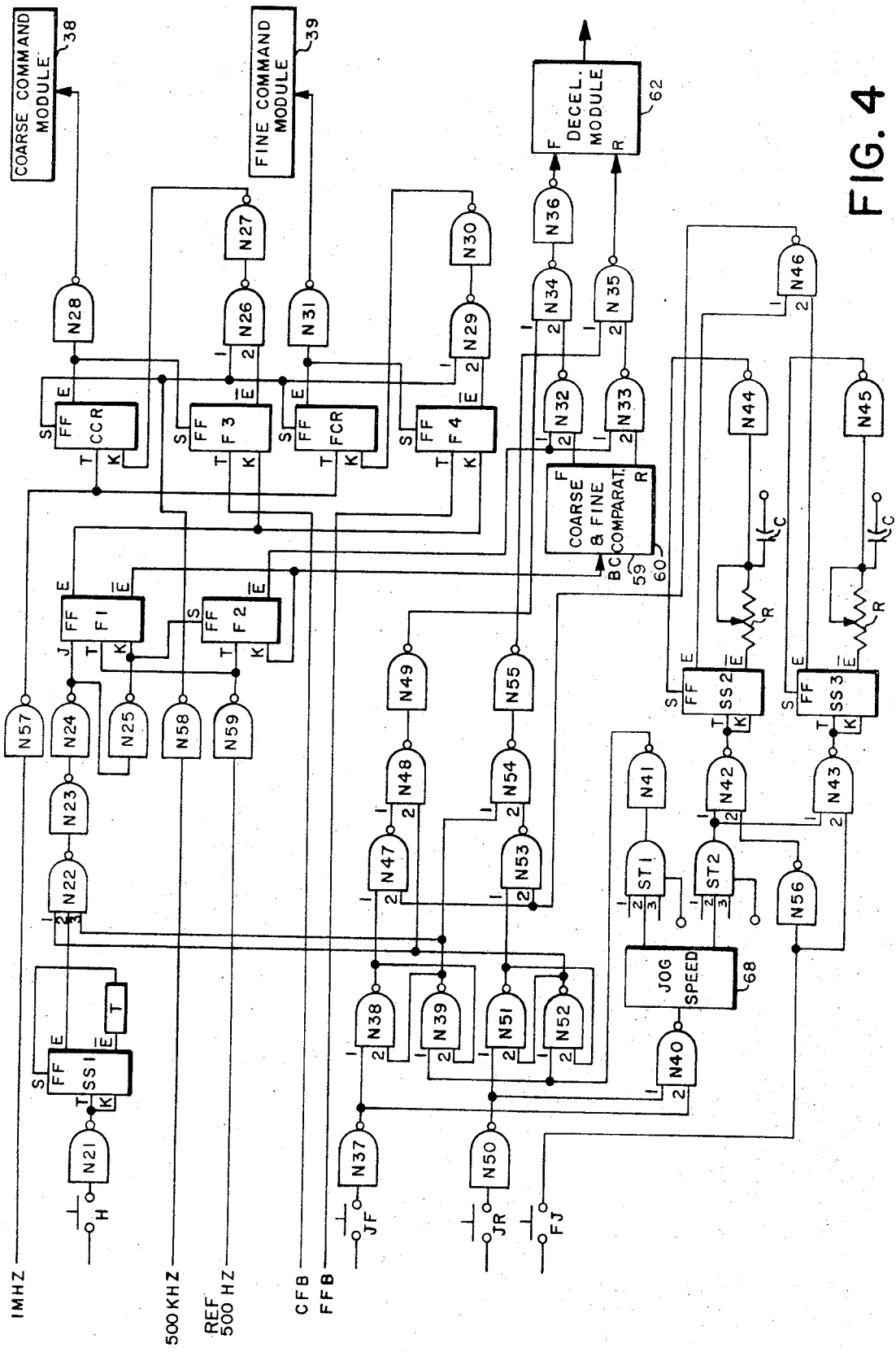
FIG. 4 is a schematic and block diagram of the circuitry used to cause the machine in FIG. 1 to operate in a hold position and/or a jogging mode of operation.

Referring to FIGS. 1 and 4, the hold and jog circuit in FIG. 4 provides the functions included in the hold-jog module 34 and the switch module 61 and receives the 1 MHZ, the 500 KHZ and the 500 HZ reference input signals from the timing module 42. The switches H, JF, JR and FJ shown in FIG. 2 are included in the control module 32. The hold-jog circuit provides inputs F and R to the deceleration module 62 and inputs CCR and FCR to the coarse and the fine comparators 59–60. The circuit shown in FIG. 4 includes NANDS N21–N59, flip flops SS1–SS3, F1–F4, CCR and FCR, Schmitt triggers ST1 and ST2, a timing module T, and a jog speed module 68.

During standby conditions, the hold switch H, the jog forward switch JF, the jog reverse switch JR and the fast jog switches FJ are open, so that the NANDS N21, N37, N50, N56 and N43 respectively receive a 0 input and provide a 1 output. The flip flop SS1 is in an ON state and supplies a 1 at its E output and a 0 at its $\overline{E}$ output. The 1 at the E output of the flip flop SS1 is supplied to an input of the NAND N22 which also receives a 1 input at its other two inputs in a manner which will be later described, so that the NAND N22 provides a 0 input to the NAND N23 and causes the NAND N23 to have a 1 output. The 1 output of the NAND N23 causes the NAND N24 to supply a 0 to the J input of the flip flop F1 and a 0 to the input of the NAND N25 so that the NAND N25 supplies a 1 to the K input of the flip flop F1 and the set input S of the flip flop F2. The flip flop F1 in response to the inputs at its J and K inputs supplies a 0 at its E output and a 1 at its $\overline{E}$ output. The 0 at the E output of the flip flop F1 is supplied to the K inputs of the flip flops F3 and F4. The 1 at the $\overline{E}$ output of the flip flop F1 is supplied to the K input of the flip flop F2 and as an input BC to the coarse and fine comparator circuits shown in FIG. 2. The 1 to the K input of the flip flop F2 causes the flip flop F2 to provide a 1 at its $\overline{E}$ output which is supplied to the inputs of the NANDS N32 and N33.

During standby conditions, the previously set flip flops CCR and FCR have a 1 at their respective E outputs which are respectively supplied through the NANDS N28 and N31 to the counters 39 and 38. The flip flops F3 and F4 in response to the 0 at their K inputs have a 0 at their $\overline{E}$ outputs. The 0 at the $\overline{E}$ output of the flip flop E3 causes the NAND N26 to supply a 1 input to the NAND N27 so that the NAND N27 supplies a 0 to the K input of the flip flop CCR. The 0 at the $\overline{E}$ output of the flip flop F4 causes the NAND N29 to supply a 1 input to the NAND N30 so that the NAND N30 supplies a 0 to the K input of the flip flop FCR. The flip flop F3 receives the coarse feedback signal CFB at its toggle input T and the flip flop FCR receives the fine feedback signal FFB at its toggle T input. The 500 HZ signal is connected through the NAND N59 to supply inputs to the toggle inputs T of the flip flops F1 and F2. The 500 KHZ source supplies an input through a NAND N58 to the set inputs S of the flip flops CCR and FCR as well as an input 1 of the NANDS N26 and N29. The 1MHZ source supplies an input through the NAND N57 to the toggle inputs T of the flip flops CCR and FCR so that the respective flip flops CCR and FCR supply outputs as described.

The hold period is initiated by closing the hold switch H so that a 1 is supplied to the input of the NAND N21. The NAND N21 has an output connected to the toggle input T of the flip flop SS1 which, together with the timing circuit T, is arranged to act as a single shot multivibrator. The 1 to 0 change to the input T of the flip flop SS1 switches the flip flop SS1 so that a 0 appears at its E output, which causes the NAND N22 to switch, and provide a 1 output as input to the NAND N23. The 1 to 0 signal change from the NAND N21 to the input T of the flip flop SS1 also causes the flip flop SS1 to switch and supply a 0 to 1 signal change at its $\overline{E}$ output, which change is delayed for 380 milliseconds and supplied by the timing circuit T as a 1 to 0 change to the set input S of the flip flop SS1. The 0 signal to the input S of the flip flop SS1 causes the flip flop SS1 to switch and again supply a 1 at its output E and a 0 at its output $\overline{E}$, so that for 380 milliseconds after the hold switch H is closed, a 0 appears at the output E of the flip flop SS1. The 0 output of the NAND N23 is first inverted by the NAND N24 and supplied as a 1 to the J input of the flip flop F1 and again inverted by the NAND N25 and supplied as a 0 to the K input of the flip flop F1 and the S input of the flip flop F2. Flip flops F1 and F2 have their toggle inputs T connected through the NAND N59 to receive the 500 HZ signals so that at an appropriate 1 to 0 signal change at their inputs T, the flip flops F1 and F2 switch so that the flip flop F1 supplies a 1 at its E output and a 0 at its $\overline{E}$ output. The 1 at the E output of the flip flop F1 is supplied to the inputs K of the flip flops F3 and F4 so that the flip flops F3 and F4 are conditioned to be switched upon a 1 to 0 change at their toggle T inputs. The 0 at the $\overline{E}$ input of the flip flop F1 is supplied to the K input of the flip flop F2 and as the signal BC to the comparators 59–60. The signal BC, which is supplied to the set inputs S of the flip flops FWD and REV and the NANDS N15 and N19 in the comparator circuits shown in FIG. 2, prevents the switching of the flip flops FWD, REV, FFWD and FREV to their OFF states and thus prevents the circuits within the comparators 59–60 from switching in response to the command signals and feedback signals. The flip flop F2 in response to the 0 at its S input supplies a 0 at its $\overline{E}$ output which causes the NANDS N32 and N33 to have a 1 output, the NANDS N34 and N35 to have a 0 output and the NAND N36 to have a 1 output. The output of the NANDS N35 and N36 are respectively supplied to the reverse and forward inputs R and F of the deceleration module 62 which, in response thereto, interrupts the energization of the motor 26 so that the motor 26 begins to coast to a stop. The motor 26 causes the rotation of the feedback resolvers 44 and 45. The resolvers 46 and 47 have their respective outputs connected to supply the toggle inputs T of the flip flops F3 and F4 with the coarse and the fine feedback signals CFB and FFB so that when the respective feedback signals CFB and FFB change from 1 to 0, the flip flops F3 and F4 switch ON and provide a 1 at their associated $\overline{E}$ outputs. The 1 at the $\overline{E}$ outputs of the flip flops F3 and F4 is supplied as an input to the NANDS N26 and N29 respectively. The NANDS N26 and N29 also receive an input through the NAND N58 from the 500 KHZ pulse source so that when the output of the NAND N58 changes from 0 to 1, the NANDS N26 and N29 respectively will provide 0 inputs to the NANDS N27 and N30 and cause the NANDS N27 and N30 to switch and provide a 1 to the K inputs of the flip flops CCR and FCR. The 1 output of the NAND N58, which caused the NANDS N27 and N30 to have 1 outputs is also supplied as an input to the set inputs S of the flip flops CCR and FCR so that the flip flops CCR and FCR are conditioned to switch and supply a 0 at their associated E outputs upon a suitable 1 to 0 change from the 1MHZ source through the NAND N57 at their associated inputs T which occurs 500 nanoseconds after the signal change at their set inputs S.

The 0 at the E outputs of the flip flops CCR and FCR, which are respectively supplied to the set inputs S of the flip flops F3 and F4, causes the flip flops F3 and F4 to switch and again supply a 0 at their associated $\overline{E}$ outputs. The 0 at the $\overline{E}$ outputs of the flip flops F3 and F4 is respectively supplied to the K inputs of the flip flops CCR and FCR through the associated NANDS N26–N30. Thus 500 nanoseconds after the flip flops CCR and FCR are switched to supply a 0 at their associated E outputs, a signal change of 1 to 0 at the S input of the flip flops CCR and FCR from the 500 KHZ source through the NAND N58 causes the flip flops CCR and FCR to switch and again supply a 1 at the associated E outputs. Thus as the motor M coasts to stop, the counters 38 and 39 will be reset with a 0 pulse that has a 500 nanosecond duration each time the coarse and the fine feedback signals CFB and FFB respectively change from 1 to 0, which occurs at a rate of 500 cycles per second or approximately 190 times during the 380 millisecond interval as determined by the switching of the flip flop SS1.

As previously described, the single shot flip flop SS1 switches to provide a 1 at its E output 380 milliseconds after the switch H is closed. The 1 at the E output of the flip flop SS1 switches the NANDS N22–N25 so that the NAND N24 supplies a 0 to the J input of the flip flop F1 and the NAND N25 supplies a 1 to the input S of the flip flop F2 and a 1 to the input K of the flip flop F1 so that the flip flops F1 and F2 are conditioned to switch to their standby states upon the receipt of the suitable 1 to 0 at their inputs T from the 500 HZ source through the NAND N59. When the flip flops F1 and F2 are in their standby states, the E output of the flip flop F1 is 0 and the $\overline{E}$ outputs of the flip flops F1 and F2 are 1. The 0 at the E output of the flip flop F1, which is supplied to the K inputs of the flip flops F3 and F4, causes the flip flops F3 and F4 to remain in their OFF states so that their $\overline{E}$ outputs are a continuous 0 in spite of the fact that the flip flops F3 and F4 are receiving a 1 to 0 signal change at their toggle inputs T from the feedback signals CFB and FFB. The 0 to 1 change at the $\overline{E}$ output of the flip flop F1, which is supplied to the input K of the flip flop F2, causes the flip flop F2 to switch to its standby state when the signal at its toggle input T from the NAND N59 changes from 1 to 0. The 1 at the $\overline{E}$ output of the flip flop F2 removes the blocking signal BC to the comparators 59–60 so that the operation of the circuitry within the comparators 59–60 is restored. The 1 signal at the $\overline{E}$ output of the flip flop F2, when the flip flop F2 is reset, permits the NANDS N32 and N33 to have a 0 output, the NANDS N34 and N35 to have a 1 output and the NAND N36 to have a 0 output so that the outputs of the NANDS N35 and N36 are in their standby condition.

The motor M may be caused to operate in a jogging mode either in the forward direction when the jog forward switch JF is closed, or in the reverse direction when the jog reverse switch JR is closed. During standby conditions, that is, when both the switches JF and JR are open, the forward and reverse jog circuits will be conditioned as follows. The NAND N37 will have a 0 input and supply a 1 output to the NAND N38 and the NAND N40. The NAND N38 is connected to the NAND N39 so that the NANDS N38 and N39 act as a NAND memory. The NAND N50 will have a 0 input and therefore supply a 1 input to the NANDS N51 and N40. The NAND N51 is connected to the NAND N52 so that the NANDS N51 and N52 act as a NAND memory. The NAND N40, during standby, has a 1 on all of its outputs and supplies a 0 to a circuit within a jog speed module 68. The 0 input to the module 68 causes the circuitry within the module 68 to supply a 1 input to the NAND N41 through a solid state Schmitt trigger ST1 and 0 input signal pulses to the NANDS N42 and N43 through a solid state Schmitt trigger ST2. The 1 input to the NAND N41 causes the NAND N41 to supply a 0 to the inputs of the NANDS N39 and N52 which switches the NAND memories so that the NANDS N38 and N51 have a 0 output and the NANDS N39 and N52 have a 1 output. The 1 output of the NANDS N39 and N52 are respectively supplied to a pair of inputs of the NAND N22 in the hold circuit which permits the NAND N22 to be switched in response to the 1 to 0 signal change from the E output of the flip flop SS1 when the switch H is closed, as previously described. The 0 outputs of the NANDS N38 and N51, which are respectively supplied as inputs to the NANDS N47 and N53, cause the NANDS N47 and N53 to have a 1 output. The output of the NAND N47 is supplied to an input of the NAND N48 which also receives a 1 input from the NAND N52 so that the NAND N48 supplies a 0 output which is inverted by the NAND N49 and supplied as a 1 input to the NAND N34. The 0 output of the NAND N51 causes the NAND N53 to have a 1 output which is supplied as an input to the NAND N54. The NAND N54 also receives a 1 at its other input from the NAND N39 so that the NAND N54 supplies a 0 input to the NAND N55 and causes the NAND N55 to supply a 1 as an input to the NAND N35. The comparators 59–60 have outputs F and R respectively connected as inputs to the NANDS N32 and N33. When positioning is not required, the outputs F and R of the comparators 59 and 60 are a continuous 1. Thus when positioning is not required and the jog switches JF and JR are open, all of the inputs of the NANDS N32 and N33 will be 1 and the NANDS N32 and N33 will provide a 0 output. When the motor 26 is to be rotated in the forward direction, the signal at the F output of the comparators 59–60 will be pulsed to 0 and cause the NAND N32 to provide a 1 output pulse. Similarly, when the motor 26 is to be rotated in a reverse direction, the signal at the R output of the comparators 59–60 will be pulsed to 0 and cause the NAND N33 to provide a 1 output pulse. When the NAND N32 has a 0 output, the output of the NAND N34 will be 1 and the output of the NAND N36 0, which is supplied to the F input of a deceleration module 62. When the NAND N33 has a 0 output, the NAND N35 will have a 1 output, which is supplied to the R input of the deceleration module 62. A switch in the output of the NAND N32 from the 0 to 1 will cause the output of the NAND N36 to switch from 0 to 1 and the deceleration module 62 to provide an output which will cause the motor 26 to operate in the forward direction. Similarly, a change in the output of the NAND N33 from 0 to 1 will cause the output of the NAND N35 to switch from 1 to 0 and the deceleration module 62 to provide an output which will cause the motor 26 to operate in the reverse direction. However, the circuitry within the deceleration module 62 is arranged so that when the inputs to the NANDS N32 and N33 are simultaneously 0, as occurs during the 380 milliseconds when the switch H is closed, the deceleration module 62 will not have an output which will cause the motor 26 to operate in either the forward or the reverse directions. The outputs of the NANDS N42 and N43 are respectively connected to the toggle inputs T of the flip flops SS2 and SS3. The flip flops SS2 and SS3 have their E outputs connected to supply an input to the NAND N46. The flip flop SS2 has its $\overline{E}$ output connected through a time delay circuit consisting of an adjustable resistor R and a capacitor C to an input of the NAND N44 which in turn has its output connected to the set input S of the flip flop SS2. The flip flop SS3 has its $\overline{E}$ output connected through a time delay circuit consisting of an adjustable resistor R and capacitor C to an input of the NAND N45 which has its output connected to the set input S of the flip flop SS3. When the flip flops SS2 and SS3 are set, they respectively supply a 1 at their E outputs and a 0 at their $\overline{E}$ outputs. The NAND N46 in response to the 1 at the E outputs of the flip flops SS2 and SS3 provides a 0 input to the NANDS N47 and N53 which prevents the NANDS N47 and N53 from being switched when the outputs of the NANDS N38 and N51 become 1 as will be later described.

During intervals when the fast jog switch FJ is open, the NANDS N56 and N43 have a 0 input and respectively supply a 1 input to the NAND N42 and the toggle input T of the flip flop SS3. The 1 input to the NAND N42 from the NAND N56 permits the NAND N42 to be switched when the output signal pulses through the Schmitt trigger ST2 change to 1. The 0 input to the NAND N43 prevents the NAND N43 from switching when the output pulses of the Schmitt trigger ST2 switches from 0 to 1.

The motor 26 will be caused to operate in the jogging mode in the forward direction by closing switch JF so that the input to the NAND N37 changes from 0 to 1 and the NAND N37 provides a 0 output which causes the outputs of the NANDS N38 and N40 to become 1. The change in the output of the NAND N38 for a short time period after the switch JF is closed, i.e., 50 milliseconds, does not cause any change in the remaining portions of the circuit as the NAND N39 continues to receive a 0 input from the NAND N41 so its output remains 1 and the NAND N47 continues to receive a 0 input from the NAND N46 so its output remains 1.

The circuitry within the jog speed module 68 is arranged so that approximately 50 milliseconds after the output of the NAND N40 changes from 0 to 1, the output of the Schmitt triggers ST1 and ST2 will respectively change so that the Schmitt trigger ST1 provides a continuous 0 output and the Schmitt trigger ST2 provides a pulsing 1 output. The 0 signal output of the Schmitt trigger ST1 is inverted by the NAND N41 and supplied as a 1 input to the NAND N39. As all of the inputs of the NAND N39 are now 1, the NAND N39 output switches to 0 which is supplied as an input to the NANDS N22 and N54. The 0 input to the NAND N22 causes the NAND N22 to switch and provide a 1 output and the NAND N23 to have a 0 output. The 0 output of the NAND N23 is first inverted by the NAND N24 and supplied as a 1 to the J input of the flip flop F1 and is again inverted by the NAND N25 and supplied as a 0 to the K input of the flip flop F1 and to the set input S of the flip flop F2. The flip flops F1 and F2 have their toggle inputs T connected through the NAND N59 to receive signal pulses from the 500 HZ source so that upon the receipt of an appropriate 1 to 0 signal change at their toggle inputs T, the flip flops F1 and F2 switch so that the flip flop F1 supplies a 1 at its E output and a 0 at its $\bar{E}$ output. The 0 at the $\bar{E}$ output of the flip flop F1 is supplied to the K input of the flip flop F2 and as a signal BC to the comparators 59–60. The signal BC causes the operation of the circuitry within the comparators 59–60 to be blocked so that the signals at the R and F outputs of the comparators 59–60 are a continuous 1. The flip flop F2, in response to the 0 at its S input, supplies a 0 at its $\bar{E}$ output which causes the NANDS N32 and N33 to each have a 1 output so that the switching of the NANDS N34 and N35 is controlled by the output signals from the NANDS N49 and N55. When the motor 26 is energized to operate in a jogging mode, in a manner which will be later described, the feedback resolvers 46 and 47 will provide coarse and fine feedback signals CFB and FFB as inputs to the input toggles T of the flip flops CCR and FCR respectively. The 1 to 0 change in the signals CCR and FCR to the toggles T of the flip flops CCR and FCR causes the flip flops CCR and FCR to switch and provide a 1 at their associated $\bar{E}$ outputs which is respectively supplied as inputs to the NANDS N26 and N29. The NANDS N26 and N29 also receive input pulses through the NAND N58 from the 500 KHZ source so that when the output of the NAND N58 changes from 0 to 1, the NANDS N26 and N29 will provide 0 inputs to the respective NANDS N27 and N30. The NANDS N27 and N30 in response to the 0 inputs respectively provide a 1 to the K inputs of the flip flops CCR and FCR. The 1 output of the NAND N58 which caused the NANDS N27 and N30 to have 1 outputs is also supplied as an input to the inputs S of the flip flops CCR and FCR so that the flip flops CCR and FCR are conditioned to be switched and supply a 0 at their associated E outputs upon the receipt of a suitable 1 to 0 change from the NAND N57 at their toggle inputs T which occurs 500 nanoseconds after the 0 to 1 signal change at their associated set inputs S. The 0 at the E outputs of the flip flops CCR and FCR, which is respectively supplied to the set inputs S of the flip flops F3 and F4, causes the flip flops F3 and F4 to switch and again supply a 0 at their associated $\bar{E}$ outputs. The 0 at the $\bar{E}$ outputs of the flip flops F3 and F4 is supplied to the K inputs of the flip flops CCR and FCR through the associated NANDS N26–N30. Thus 500 nanoseconds after the flip flops CCR and FCR are switched to supply a 0 at their associated E outputs, a signal change of 1 to 0 at the S inputs of the flip flops CCR and FCR from the 500 KHZ source through the NAND N58 causes the flip flops CCR and FCR to switch and again supply a 1 at their associated E outputs. Thus when the motor 26 is energized to operate in a jogging mode, the coarse and the fine command counters 38 and 39 will be respectively reset with the 0 pulse that has a 500 nanosecond duration as the coarse feedback signal CFB and the fine feedback signal FFB change from 1 to 0, so that the counters 38 and 39 will be continuously updated to provide output signals which correspond in phase to the output signal from the feedback resolvers 46 and 47.

As previously described, the NAND N39 supplies an input to the NANDS N22 and N54 and when the output of the NAND N39 changes from 1 to 0, the output $\bar{E}$ of the flip flop F2 changes from 1 to 0. The 0 at the $\bar{E}$ output of the flip flop F2 provides an input to the NANDS N32 and N33 which prevents the NANDS N32 and N33 from being switched by the output signals from the comparators 59–60 and causes the NANDS N32 and N33 to respectively supply 1 inputs to the NANDS N34 and N35 which permits the switching of the NANDS N34 and N35 to be exclusively controlled by the outputs of the NANDS N49 and N55 respectively. As previously described, the open switch JR will cause the NAND N55 to supply a continuous 0 input to the NAND N35 to prevent the deceleration module 62 from energizing the motor 26 in the reverse direction. When the switch JF is closed, the output of the NAND N49 will exist as a series of 1 to 0 pulses which are provided by a circuit which will now be described.

The circuitry within the jog speed module 68 is arranged so that the Schmitt trigger ST2 provides 1 pulses which occur at progressively increasing frequency until the frequency of the 1 pulses becomes constant, which occurs approximately one second after the output of the NAND N40 changes from 0 to 1. The 1 output pulses of the Schmitt trigger ST2, during periods when the switch FJ is open, will not switch the NAND N43 as the NAND N43 receives a continuous 0 at one of its inputs because of the open switch FJ. The 1 output pulses from the Schmitt trigger ST2 are inverted by the NAND N42 and supplied as 1 to 0 signal changes to the input toggle T of the flip flop SS2 which causes the flip flop SS2 to switch to its ON state and supply a 0 at its E output and a 1 at its $\bar{E}$ output each time the input to its toggle T changes from 1 to 0. The $\bar{E}$ output of the flip flop SS2 is supplied through a fixed time delay circuit consisting of the resistor R, the capacitor C and the NAND N44 to the set input S of the flip flop SS2 so that a fixed time delay after the flip flop SS2 is switched to its ON state by the 1 to 0 pulse at its toggle T, the flip flop SS2 will be switched to its OFF state by a 1 to 0 at its set input S. Thus the flip flop SS2 will supply 1 to 0 pulses at its E output which have a fixed pulse width each time the pulses appearing at its toggle T change from 1 to 0. The 0 pulses at the E output of the flip flop SS2 are inverted by the NAND N46 and supplied as 1 input pulses to the NAND N47 which receives a 1 at its other input from the NAND N38 so that each time the NAND N46 supplies the NAND N47 with a 1 pulse, the NAND N47 switches its output and provides the NAND N48 with a 0 pulse. The 0 input pulses to the NAND N48 causes the NAND N49 to supply the NAND N34 with 1 input pulses and the NAND N34 to provide the NAND N36 with 0 pulses which are inverted and supplied as 1 pulses to the F input of the deceleration module 62. The deceleration module 62, in response to the 1 input pulses causes the motor 26 to be energized to rotate in the forward direction at a speed which corresponds to the frequency and width of the 1 output pulses of the NAND N46, as determined by the jog speed module 68 and the switching of the flip flop SS2 to its ON and OFF states.

The opening of the jog forward switch JF will restore the 0 input to the NAND N37 and cause the NAND N40 to have a 0 output. The circuitry within the jog speed module 68 is arranged so that for a short period of time, i.e., one tenth of a second, after the output of the NAND N40 switches from 1 to 0, the Schmitt trigger ST1 will cause the NAND N41 to provide a 1 output which is ineffective to reset the NAND memory consisting of the NANDS N38 and N39. Thus the NAND N38 will continue to supply the NAND N47 with a 1 input and the NAND N39 will continue to supply the NANDS N22 and N48 with 0 input to maintain the remaining NANDS in the jog circuit in the states they were in when the jog switch JF was initially closed. Further, the circuitry within the jog speed module 68 is arranged so that during the one tenth of a second period, the Schmitt trigger ST2 will continue to provide 1 pulses which occur at a progressively decreasing frequency until the output of the Schmitt trigger ST2 becomes a continuous 0 so that the F input of the deceleration module 62 is provided with pulses at a decreasing frequency which will cause the energization of the motor to be progressively decreased to minimize shock to the mechanical components which are driven by the motor 26. At the end of the one tenth of a second time period, the output of Schmitt trigger ST1 becomes 1 which causes the NAND N41 to provide a 0 output which is effective to reset the NAND memory so that the NAND N39 provides a 1 output and the NAND N38 a 0 output to restore the circuit to its standby state. However, during the one tenth of a second interval, the counters 38 and 39 will be continuously updated so their outputs are in phase with the output of the feedback resolvers 46 and 47 when the motor 26 stops rotating in the forward direction at the end of the jogging operation.

The motor 26 will be caused to operate in the jogging mode in the reverse direction by closing switch JR so that the input to the NAND N50 changes from 0 to 1 and the NAND N50 provides a 0 output which causes the outputs of the NANDS N51 and N40 to become 1. The change in the output of the NAND N51 for a short time period after the switch JR is closed, i.e., 50 milliseconds, does not cause any change in the remaining portions of the circuit as the NAND N52 continues to receive a 0 input from the NAND N41 in a manner as described when the jog forward JF was initially closed. Thus the output of the NAND N52 remains 1 and the NAND N53 continues to receive a 0 input from the NAND N46 so its output remains 1.

The circuitry within the jog speed module 68 is arranged so that approximately 50 milliseconds after the output of the NAND N40 changes from 0 to 1, the output of the Schmitt triggers ST1 and ST2 will respectively change so that the Schmitt trigger ST1 provides a continuous 0 output and the Schmitt trigger ST2 provides a pulsing 1 output. The 0 signal output of the Schmitt trigger ST1 is inverted by the NAND N41 and supplied as a 1 input to the NAND N52. As all of the inputs of the NAND N52 are now 1, the NAND N52 output switches to 0 which is supplied as an input to the NANDS N22 and N48. The 0 input to the NAND N22 causes the NAND N22 to switch its output and cause the coarse and fine command counters 38 and 39 to be respectively reset with the 0 pulses that have a 500 nanosecond duration as the coarse feedback signal CFB and the fine feedback signal FFB change from 1 to 0 in the same manner as when the jog forward switch JF was closed.

As previously described, the NAND N52 supplies an input to the NANDS N22 and N48 and when the output of the NAND N52 changes from 1 to 0, the output $\bar{E}$ of the flip flop F2 provides an input to the NANDS N32 and N33 which prevents the NANDS N32 and N33 from being switched by the output signals from the comparators 59–60 and causes the NANDS N32 and N33 to respectively supply 1 inputs to the NANDS N34 and N35 which permits the switching of the NANDS N34 and N35 to be exclusively controlled by the outputs of the NANDS N49 and N55, respectively. As previously described, the open switch JF will cause the NAND N49 to supply a continuous 0 input to the NAND N34 to prevent the deceleration module 62 from energizing the motor 26 in the forward direction. When the switch JR is closed, the output of the NAND N55 will exist as a series of 1 to 0 pulses which increase in frequency during a one second interval and are provided by the circuitry within the module 68 and the output E of the flip flop SS2, as previously described. The flip flop SS2 supplies 1 to 0 pulses at its E output which have a fixed pulse width each time the pulses at its toggle change from 1 to 0. The 0 pulses at the E output of the flip flop SS2 are inverted by the NAND N46 and supplied as 1 input pulses to the NAND N53 which receives a 1 at its other input from the NAND N51 so that each time the NAND N46 supplies the NAND N53 with a 1 pulse, the NAND N53 switches its output and provides the NAND N54 with a 0 pulse. The 0 input pulses to the NAND N54 causes the NAND N55 to supply the NAND N35 with 1 input pulses and the NAND N35 to provide 0 pulses to the F input of the deceleration module 62. The deceleration module 62, in response to the 0 input pulses, causes the motor 26 to be energized to rotate in the reverse direction at a speed which corresponds to the frequency and width of the 1 output pulses of the NAND N46, as determined by the module 68 and the switching of the flip flop SS2 to its ON and OFF states.

The opening of the switch JR will restore the 0 input to the NAND N50 and cause the NAND N40 to have a 0 output. The circuitry within the module 68 is arranged so that for a short period of time, i.e., one tenth of a second, after the output of the NAND N40 switches from 1 to 0, the Schmitt trigger ST1 will cause the NAND N41 to provide a 1 output which is ineffective to reset the NAND memory consisting of the NANDS N51 and N52. Thus the NAND N51 will continue to supply the NANDS N22 and N54 with 0 input to maintain the remaining NANDS in the jog circuit in the states they were in after the switch JR was initially closed. Further, the circuitry within the module 68 is arranged so that during the one tenth of a second period, the Schmitt trigger ST2 will continue to provide 1 pulses which occur at a progressively decreasing frequency until the output of the Schmitt trigger ST2 becomes a continuous 0 so that the R input of the deceleration module 62 is provided with pulses at a decreasing frequency which will cause the energization of the motor to be progressively decreased to minimize shock to the mechanical components which are driven by the motor 26. At the end of the one tenth of a second time period, the output of Schmitt trigger ST1 becomes 1 which causes the NAND N41 to provide a 0 output which is effective to reset the NAND memory so that the NAND N52 provides a 1 output and the NAND N51 a 0 output to restore the circuit to its standby state. However, during the one tenth of a second interval, the counters 38 and 39 will be continuously updated so their outputs are in phase with the output of the feedback resolvers 46 and 47 when the motor 26 stops rotating in the reverse direction at the end of the jogging operation.

The motor will operate in the fast jog mode in either the forward or reverse direction by simultaneously closing the switch FJ and the switches JF or JR. When the switch FJ is closed, the inputs to the NANDS N56 and N43 will be 1, and the NAND N56 will supply a 0 input to the NAND N42 which prevents the NAND N42 from switching in response to the 1 signal pulses from the Schmitt trigger ST2. The 1 input to the NAND N43 permits the NAND N43 to be switched by the 1 signal pulses from the Schmitt trigger ST2 so that the NAND N43 supplies a 1 to 0 signal change to the toggle T of the flip flop SS3 each time the output of the Schmitt trigger ST2 changes to provide a 1 pulse. The mode of operation and the circuitry associated with the flip flop SS3 is identical to the circuitry which is associated with the flip flop SS2, with the exception that the delay circuit, including the resistor R, the capacitor C and the NAND N45 provide a longer time delay than the resistor, capacitor and NAND N44 associated with the flip flop SS2 so that the output pulses appearing at the E output of flip flop SS3 have a longer duration than the pulses appearing at the E output of the flip flop SS1. Thus when the switch FJ is closed, the 1 output pulses of the NAND N46 will have a greater time duration and the motor 26 will be energized by current pulses having a greater time duration so that the speed of the motor 26 will be increased when either of the switches JF or JR are closed.

JOG SPEED MODULE

Figure 5:
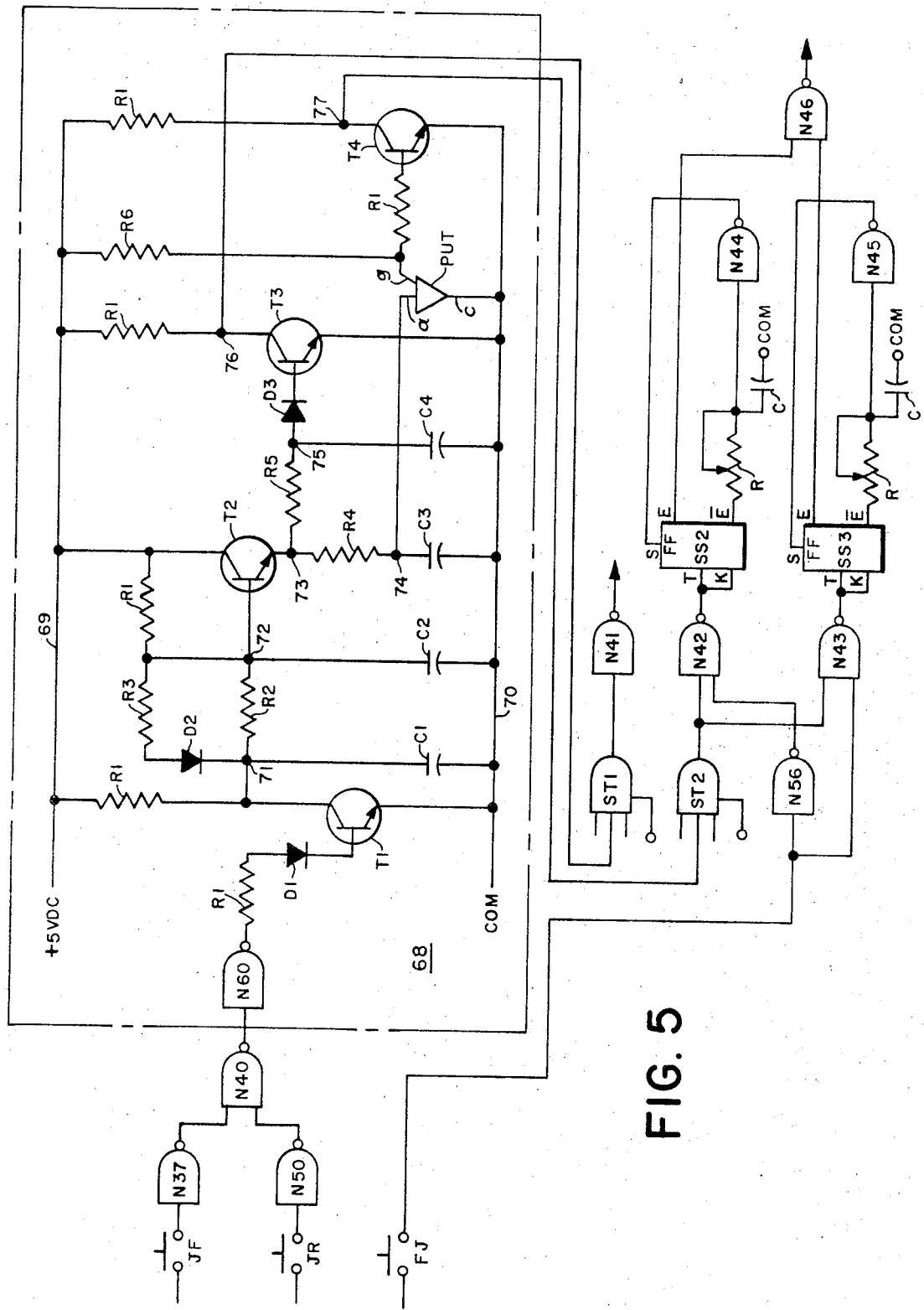
FIG. 5 is a schematic diagram of the circuitry used to control the energization and de-energization of a drive motor for the machine in FIG. 1 when the jogging mode of operation is initiated and terminated.

The circuitry in FIG. 5 which controls the energization of the motor 26 during jogging includes the circuit within the jog speed module 68 as well as other circuit components which are the same components as are used in FIG. 4. The circuit components which are common to the circuits in FIGS. 4 and 5 include the switches JF, JR and FJ, the NANDS N37, N50, N40 and N41–46, the Schmitt triggers ST1 and ST2, and flip flops SS2 and SS3 together with their associated timing circuits. The circuit within the jog speed module 68 includes a NAND N60, npn type transistors T1–T4, diodes D1–D3, capacitors C1–C4, load resistors R1, timing resistors R2, R3, R4 and R5 and a programmable unijunction transistor PUT.

The jog forward JF and the jog reverse JR switches are respectively connected through the NANDS N37 and N50 to the inputs of the NAND N40. The NAND N40 provides an input to the NAND N60 within the jog speed module 68. The output of the NAND N60 is connected through a load resistor R1 and a diode D1 to the base of the transistor T1. The diode D1 is poled to conduct current toward the base of the transistor T1. The transistor T1 has its collector connected through a load resistor R1 to a lead 69 which is connected to a positive 5 volt D.C. source and its emitter connected to a lead 70 which is common to the source that is connected to lead 69. The collector of the transistor T1 is also connected through a junction 71 to one side of the capacitor C1 which has its other side connected to the lead 70. The junction 71 is connected through parallel RC charging and discharging paths for the capacitor C2. The charging path for the capacitor C2 includes the resistor R2 and a junction 72 which is connected to one side of the capacitor C2. The other side of the capacitor C2 is connected to the lead 70. The discharge path for the capacitor C2 includes the diode D2 and the resistor R3 which are connected in series between the junctions 71 and 72. The diode D2 is poled to conduct current from the junction 72 to the junction 71. The junction 72 is also connected to the base of the transistor T2 and through a resistor R1 to the collector of the transistor T2, which in turn is connected to the lead 69. The emitter of the transistor T2 is connected through a junction 73 and a resistor R4 to a junction 74. The capacitor C3 is connected between the junction 74 and the lead 70. The junction 73 is connected through a timing resistor R5 to a junction 75 which in turn is connected to one side of the capacitor C4 which has its other side connected to the lead 70. The junction 75 is also connected through the diode D3 to the base of the transistor T3 which has its emitter directly connected to the lead 70. The diode D3 is poled to conduct current from the junction 75 to the base of the transistor T3. The collector of the transistor T3 is connected through a junction 76 and a resistor R1 to the lead 69. The junction 76 is connected to an input of the Schmitt trigger ST1. The junction 74 is connected to the anode $a$ of the programmable unijunction transistor PUT which has its cathode $c$ connected to the lead 70 and its gate $g$ connected through a load resistor R1 to the base of the transistor T4 as well as through a load resistor R6 to the lead 69. The transistor T4 has its emitter connected directly to the lead 70 and its collector connected through a junction 77 and a load resistor R1 to the lead 69. The junction 77 is connected to an input of the Schmitt trigger ST2. The Schmitt trigger ST1 is connected through the NAND N41 to control the switching of the NAND memories in FIG. 4, as previously described. The Schmitt trigger ST2 has its output arranged to control the switching of the flip flops SS2 and SS3 so that the outputs E of the flip flops SS2 and SS3 will provide output signals to the NAND N46 in a manner described in connection with the circuit shown in FIG. 4. The fast jog switch FJ is connected to control the inputs to the NANDS N43 and N56. When the fast jog switch FJ is open, the NAND N42 will be controlled by the pulse output of the Schmitt trigger ST2 and the NAND N43 will be prevented from supplying signals to the toggle T of the flip flop SS3 in response to the pulse output of the Schmitt trigger ST2. When the jog switch FJ is closed, the NAND N56 will have an output which will prevent the NAND N42 from switching in response to the pulse output of the Schmitt trigger ST2 and permit the NAND N43 to supply the toggle input T of the flip flop SS3 with pulse input signals in response to the output of the Schmitt trigger ST2.

The jog speed module 68 is arranged to accept the digital output signal of the NAND N40 and convert the digital signal to an analog signal which is in the form of a ramp voltage. The ramp voltage within the module 68 controls the frequency of a relaxation oscillator from 0 to 1.5 KHZ. The pulses from the oscillator are squared by the integrated circuits withing the Schmitt trigger ST2 and are fed to the pulse width circuitry including the flip flops SS2 or SS3 for slow or fast jogging mode operation.

When the circuit, including the module 68, is in standby, the switches JF, JR and FJ are open, and the NAND N40 supplies a 0 input signal to the NAND N60. The 0 input to the NAND N60 causes the transistor T1 to conduct and a 0 to appear at the junction 71. The conducting transistor T1 causes the capacitors C1 and C2 to be discharged and the transistor T2 to be nonconducting so a 0 appears at the junction 73. The 0 at the junction 73 prevents the capacitors C3 and C4 from being charged and causes the transitor T3 to be nonconducting so a 1 appears at the junction 76. The 1 at the junction 76 causes the Schmitt trigger ST1 to supply a 1 output signal. The discharged capacitor C3 causes the programmable unijunction transistor PUT to be nonconducting which in turn causes the transistor T4 to conduct and a 0 to appear at the junction 77. The 0 at the junction 77 is supplied to the Schmitt trigger ST2 so that the Schmitt trigger ST2 provides the NANDS N42 and N43 with continuous 0 inputs. Further, during standby, the 0 inputs to the NANDS N43 and N56, which are present when the switch FJ is open, permits the NAND N42 to respond to the signal pulses from the Schmitt trigger ST2 and prevents the NAND N43 from responding to the output signal pulses of the Schmitt trigger ST2.

During jogging, that is, when either of the switches JF or JR are closed, the output of the NAND N40 changes from 0 to 1 and the output of the NAND N60 changes from 1 to 0. The 0 output of the NAND N60 causes the transistor T1 to switch OFF and a 1 to appear at the junction 71. The 1 at the junction 71 causes the capacitor C2 to charge through the RC timing circuit including the resistor R2 at a rate which provides a 1 second delay before the capacitor C2 is fully charged. The increasing charge on the capacitor C2 causes the conduction of the transistor T2 to progressively increase so that the charging rate of the capacitor C3 is progressively increased through the RC charging circuit that includes the conducting transistor T2, the junction 73, the timing resistor R4 and the junction 74.

The programmable unijunction transistor is switched into a conductive state and provides a low impedance discharge circuit for the charge on the capacitor C3 each time the charge on the capacitor C3 reaches a value which exceeds the intrinsic stand-off ratio of the transistor PUT. Thus as the charging rate of the capacitor C3 is progressively increased, because of the increasing rate of conduction of the transistor T2 during the 1 second interval, the transistor PUT will be pulsed into a conductive state at a progressively increasing frequency which becomes constant after the 1 second interval. The transistor PUT, in addition to providing a low impedance discharge path for the capacitor C3, also controls the conductive state of the transistor T4. The transistor T4 amplifies and inverts the weak pulses at the gate g of the transistor PUT and causes 1 signal pulses to appear at the junction 77. The 1 signal pulses at the junction 77 are supplied to the Schmitt trigger ST2 which squares the pulses before they are supplied to the inputs of the NANDS N42 and N43. The 1 input pulses to the NAND N42, if the switch FJ is open to cause the control to operate in the slow jog mode, will provide 1 to 0 input pulses to the toggle input T of the flip flop SS2. The flip flops SS2 and SS3 have their E outputs connected to supply an input to the NAND N46. The flip flop SS2 has its $\overline{E}$ output connected through a time delay circuit consisting of an adjustable resistor R and a capacitor C to an input of the NAND N44 which in turn has its output connected to the set input S of the flip flop SS2. Similarly, the flip flop SS3 has its $\overline{E}$ output connected through a time delay circuit consisting of an adjustable resistor R and a capacitor C to an input of the NAND N45 which has its output connected to an input S of the flip flop SS3. The time delay circuit associated with the flip flop SS3 has a longer period of response than the time delay circuit that is associated with the flip flop SS2. When the flip flops SS2 and SS3 are ON, they respectively supply a 1 at their E outputs and a 0 at their $\overline{E}$ outputs.

Each 1 to 0 input change to the toggle T of the flip flop SS2 switches the flip flop from ON to OFF so a 0, which appears at its E output, causes the NAND N46 to supply a 1 output. The 1 which appears at the $\overline{E}$ output of the flip flop SS2, when the flip flop SS2 is switched from ON to OFF, is delayed in its transmission to the input of the NAND N44 by the time delay circuit so that after a fixed time delay, the NAND N44 provides a 0 input pulse to the input S of the flip flop SS2 which causes the flip flop SS2 to switch from OFF to ON. Thus the flip flop SS2 and its associated timing circuit will cause the NAND N46 to provide 1 output pulses which have a fixed pulse width each time the pulses appearing at the toggle T of the flip flop SS2 change from 1 to 0.

When the switch FJ is closed, the NAND N43 will supply 1 to 0 pulses to the toggle T of the flip flop SS3 which will cause the flip flop SS3 to provide the NAND N46 with pulses that have a longer duration than the pulses which are supplied by the flip flop SS2. Thus when the switch FJ is closed, the width of output pulses of the NAND N46 will be increased and the motor 26 energization will be increased.

The circuitry is preferably arranged so that the level of conduction of the transistor T2, which controls the potential at the junction 73 and therefore the charging rate of the capacitor C3, will cause the transistor T3 to switch ON when the charge on the capacitor C3 equals the intrinsic stand-off ratio of the transistor PUT, i.e., 50 milliseconds after the transistor T1 is switched OFF. Thus 50 milliseconds after the switches JF or JR are closed, the output of the Schmitt trigger ST1 will change from 0 to 1 and permit the NAND memories within the jog circuit to switch as previously described.

At the end of the jog operation, i.e., when the switches JF and JR are open, the input to the NAND N60 from the NAND N40 becomes 1 which causes the transistor T1 to switch ON and provide an RC discharge path through the diode D2 and the resistor R3 for the charge on the capacitor C2. The RC discharge path provided by the diode D2 and resistor R3 has a shorter time constant than is provided by the RC charging path which includes the resistor R3. The discharge path for the capacitor C2 is arranged so the capacitor C2 will be discharged in 0.1 second to a level which will cause the transistor T2 to be OFF and the transistor T3 to be ON.

The decreasing charge on the capacitor C2, during the discharge period, will cause the conduction of the transistors T2 and T3 to progressively decrease. The decreasing conduction of the transistor T2 will cause the charging rate of the capacitor C3 and the frequency of the output pulses of the Schmitt trigger ST2 to progressively decrease during the 0.1 second interval after the switches JF or JR are opened. The circuitry is preferably arranged so that as the level of conduction of the transistor T2 decreases, the potential at the junction 73 will simultaneously cause the conductive level of the transistor T3 to decrease to a value which will cause a 1 to appear at the junction 76 and the level of the charge on the capacitor C3 to be insufficient to switch the transistor PUT into conduction. Thus 0.1 second after the switches JF or JR are opened, the circuit including the circuits within the module 68 will return to their standby states.

DECELERATION MODULE

The deceleration module 62 is provided to convert the position error pulses, which are generated by the coarse and fine comparators 59 and 60, into positive or negative filtered D.C. output voltage signals which are supplied as an input to the servodrive amplifier 63. The circuitry within the module 62 modifies the position error pulses to reduce the time required during slowdown of the machine 10 as the machine 10 moves to a command position.

The circuitry within the servodrive amplifier 63 is arranged to provide an output which causes the speed of the motor 26 to be proportional to the D.C. voltage input signal which is applied to the input of the amplifier 63. Thus if the position error pulse train were simply filtered and supplied as an input to the amplifier 63, a linear relationship would exist between the positive or negative voltage signals and the position error pulse signals which would cause the motor 26 to smoothly decelerate as it approaches and drives the machine 10 to the commanded position. However, because of the linear relationship, the deceleration of the motor would cause the movement of the machine to be very sluggish as the machine approaches the command position. This result is illustrated by the broken-line curves A in FIGS. 6A and 6B, wherein the point O on the broken-line curve A in FIG. 6A designates the command position and the broken-line curve A in FIG. 6B illustrates the decrease in reference voltage during the movement of the machine 10 to the command position. It will be seen that as the reference voltage exponentially decreases, as illustrated by the broken-line curve A in FIG. 6B, the movement of the machine progressively decreases as the machine moves to the command position O. The circuitry within the module 62 shapes the position error pulses so that as the position error pulse width decreases, as the machine approaches its command position, the D.C. output voltage signal vs. the pulse width relationship becomes greater as illustrated by the solid line curve B in FIG. 6B so that the movement of the machine 10 will follow the solid line curve B in FIG. 6A.

Figure 6:
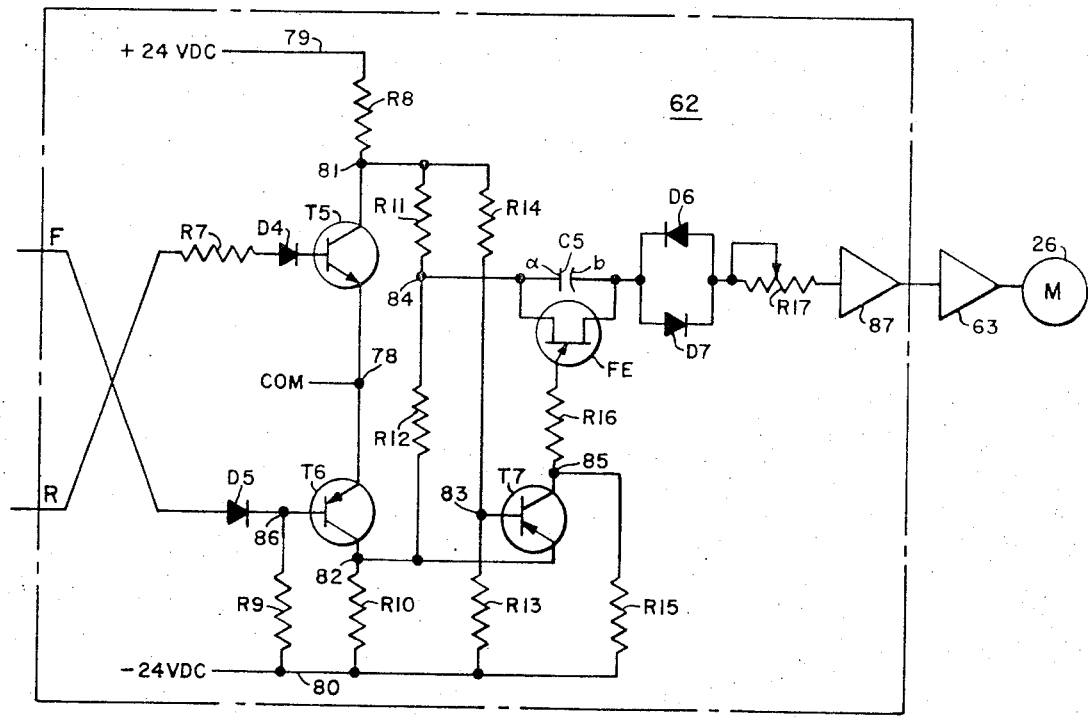
FIG. 6 is a schematic diagram of a circuit which controls the energization of the drive motors for the machine in response to the output signal from the comparator circuit in FIG. 1.
Figure 6A:
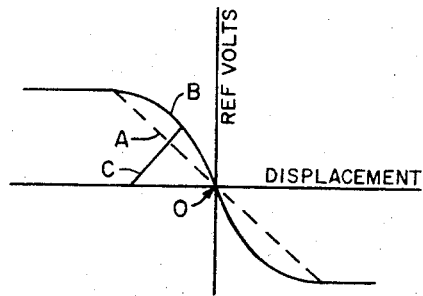
FIGS. 6A and 6B are graphs illustrating the change in the energization of the drive motor for a machine in FIG. 1 as the machine moves toward a commanded position.
Figure 6B:
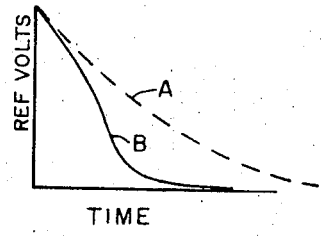

The circuitry within the deceleration module, as shown in FIG. 6, includes transistors T5–T7, a field effect transistor FE, a capacitor C5, diodes D4–D7 and resistors R7–R17. The R input terminal of the module 62 is connected through a resistor R7 and a diode D4 to the base of a npn type transistor T5. The transistor T5 has its emitter directly connected to a junction 78 that is common to a positive +24 VDC source and a —24 VDC source which are respectively connected to leads 79 and 80. The collector of the transistor T5 is connected to a junction 81 which in turn is connected through a load resistor R8 to the lead 79. The F input terminal of the module 62 is connected through a diode D5 and a junction 86 to the base of a pnp type transistor T6. The base of the transistor T6 is also connected through the junction 86 and a resistor R9 to the lead 80. The emitter of a transistor T6 is connected to the junction 78 and the collector of the transistor T6 is connected to a junction 82 which in turn is connected through a resistor R10 to the lead 80. A pair of equal impedance resistors R11 and R12 are connected in series between the junctions 81 and 82 to act as voltage dividers. A pnp type transistor T7 has its base connected to a junction 83 and its emitter directly connected to the junction 82. The collector of the transistor T7 is connected to a junction 85 which is connected through a resistor R15 to a lead 80 and through a resistor R16 to the gate electrode of an N channel type field effect transistor FE. A resistor R13 is connected between the junction 83 and the lead 80 and a resistor R14 is connected between the junction 83 and the junction 81. The field effect transistor FE has its source and drain electrodes directly connected to the opposite sides of a capacitor C5. The capacitor C5 has a side a directly connected to a junction 84 that is located between the resistors R11 and R12 and a side b connected through a pair of reversely poled diodes D6 and D7 and an adjustable resistor R17 to an input of an integrated circuit type operational amplifier and filter module 87. The module 87 has its output connected to supply an input to the servodrive amplifier 63 which controls the energization of the motor 26.

The following is a description of the operation of the circuitry within the module 62 which performs the above mentioned function. When the machine 10 is at its command position, the command and feedback signals are in phase so that the coarse and fine comparators 59 and 60 will provide signals through the NANDS N32–N36, shown in FIG. 4, to the input terminals F and R which are respectively a continuing 0 and a continuing 1. When positioning is required, that is, when the command and feedback signals are not in phase, the coarse and fine comparators 59 and 60 will provide inputs to the deceleration module 62 which exists as a train of pulses which occur at a 500 cycle per second frequency. The width of the pulses will represent the degree of the error signal, e.g., the interval in occurrence between the predetermined change in the command and feedback signals. During coarse positioning, that is, when the coarse comparator 59 is providing an output, the F input terminal of the module 62 will be provided with a series of 1 pulses, if the machine 10 is to be driven in a forward direction, and a train of 0 pulses at the R input if the machine 10 is to move in the reverse direction. The pulses during coarse positioning will have a width equal to 20 percent of each of the 500 cycles. During fine positioning, that is, when the control is responding to the output of the fine comparator 60, the F and R input terminals of the comparator 62 will be respectively supplied with 1 and 0 pulses at a rate of 500 cycles per second with the width of the pulses progressively decreasing from a maximum of 20 percent ON and 80 percent OFF to zero as the machine moves toward the command position.

Thus when positioning is not required, both transistors T5 and T6 will be conducting because of the continuous 1 signal which is impressed on the base of the npn type transistor T5 and the continuous 0 signal which is impressed on the base of the pnp type transistor T6. The base current for the transistor T5 is provided by the positive voltage at the input terminal R which causes current flow through the resistor R7, the diode D4 and the base to emitter of the transistor T5 to the junction 78 which is connected to the common lead. The emitter to collector current of the transistor T5 will cause the junction 81 to be substantially at the common potential at the junction 78. The conduction of the transistor T6 is caused by a current flow from the junction 78 through the emitter to base of the transistor T6 and the resistor R9 to the lead 80 which is connected to the −24 VDC source. The conduction of the transistor T6 will cause the junction 82 to be substantially at the common potential at the junction 78. When both transistors T5 and T6 are conducting, the junctions 81 and 82 will be at common potential so that the junction 84 which is located between the voltage dividing resistors R11 and R12 will also be at common potential.

The transistor T7 has its emitter connected to the collector of the transistor T6 at the junction 82 and its collector connected through the junction 85 and the resistor R15 to the −24 VDC source at the lead 80 and through the resistor R16 to the gate electrode of the field effect transistor FE. The base of the transistor T7 is connected to the junction 83 which in turn is connected through the resistor R13, that has a value of 220 K ohms, to the lead 80 and through the resistor R14, resistive value 100 K ohms to the junction 81. Thus when both transistors T5 and T6 are conducting, so that the junctions 81 and 82 are at common potential, the emitter of the transistor T7 will be at common potential while its base will be negative relative to its emitter so that the transistor conducts and causes the potential at the junction 85 and the gate of the field effect transistor FE to be substantially at the common potential so that the transistor FE is conditioned to conduct and provide a discharge path for any potential remaining across the capacitor C5.

The motor 26 will be energized to rotate in a forward direction when a train of positive 1 pulses are applied to the base of the transistor T6 by a signal at the input F. Each 1 pulse will cause the base of the transistor T6 to be positive relative to its emitter and the transistor T6 will be nonconductive for the duration of the 1 pulse so that a −24 VDC potential pulse appears at the junction 82. The negative potential at the junction 82 causes the transistors T7 to be nonconductive because its emitter potential is now negative relative to its base. The nonconducting transistor T7 causes the potential at the junction 85 and the gate of the transistor FE to be approximately equal to the −24 VDC supply so that the transistor FE is biased against conduction and interrupts the discharge path for the capacitor C5.

During periods when the transistor T5 is conducting and the transistor T6 is not conducting, the potential at the junction 84 will be approximately −12 VDC because the junction 81 will be at the common potential and the junction 82 at a −24 VDC potential. The negative potential at the junction 84 will cause the capacitor C5 to rapidly charge through the resistor R17 and the diode D6 in the direction making the side $b$ of the capacitor C5 positive in polarity relative to the side $a$. The charging current pulse for the capacitor C5, when the capacitor is being charged in response to the negative potential at the junction 84, is applied to the circuitry within the operational amplifier module 87. The module 87 will filter and amplify the charging current pulse and supply an output signal which has a voltage level and positive polarity which corresponds to the total energy and direction of current flow of the charging current pulse. The output signal of the module 87 is delivered as an input to the servo-amplifier 63. The servo-amplifier 63 in response to the positive polarity and voltage level of the output signal from the module 87 respectively causes the motor 26 to rotate in a forward direction at a speed which is controlled by the voltage level of the output signal.

The transistor T6 is again switched to a conductive state when the 1 signal pulse at the input terminal F disappears. The conducting transistor T6 causes the potential at the junction 82 to be substantially at common so that the transistor T7 switches to its conductive state and the potential at the junction 84 to be at common potential. The conducting transistor T7 causes the negative bias on the gate of the transistor FE to be removed so that the transistor FE provides a discharge path to rapidly dissipate the charge which was stored on the capacitor when the transistor T6 was nonconducting.

The motor 26 will be energized to rotate in a reverse direction when a train of 0 pulses are applied to the base of the transistor T5 by a signal at the input terminal R. Each 0 pulse will cause the base and the emitter of the transistor T5 to be at the same potential and the transistor T5 will be switched to a nonconductive state for the duration of the 0 pulse at the input terminal R. The nonconducting transistor T5 will cause the potential at the junction 81 to be +24 VDC and the potential at the junction 84 to be +12 VDC because of the voltage dividing action of the resistors R11 and R12 which are respectively connected to the junction 81 and the junction 82. The +24 volt VDC potential at the junction 81 also causes the potential at the junction 83 to become positive and the base of the transistor T7 to be positive in polarity relative to its emitter. The transistor T7, in response to the positive potential at the junction 83, becomes nonconducting and causes the potential at the junction 85 and the gate of the transistor FE to be approximately equal to the −24 VDC supply so that the transistor FE is biased against conduction and interrupts the discharge path for the capacitor C5. The positive potential at the junction 84 causes the capacitor C5 to rapidly charge through the diode D7 and the resistor R17 in a direction making the side of the capacitor positive in polarity. The current pulse, which appears during the charging of the capacitor C5, is supplied to the circuitry within the module 87 which filters and amplifies the pulse and supplies an input signal to the amplifier 63 which has an amplitude reflective of the current energy which was required to charge the capacitor C5 and a negative polarity dependent upon the direction of current flow which caused the a side of the capacitor C5 to be positive in polarity. The amplifier 63 in response to the negative polarity of the input signal from the module 87 energizes the motor 26 with current which will cause the motor 26 to rotate in the reverse direction at a speed which is controlled by the voltage level of the input signal from the module 87.

The transistor T5 is again switched to its conductive state when the signal at the input terminal R changes from 0 to 1. The conducting transistor T5 causes the transistor T7 to switch to its conductive state and the potential at the junction 84 to be again at the common potential. The conducting transistor T7 causes the negative bias on the gate of the transistor FE to be removed so that the transistor FE provides a discharge path to rapidly discharge the charge previously impressed on the capacitor C5 when the transistor T5 switched to its nonconductive state.

Figure 6C:
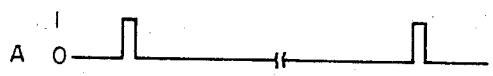
FIGS. 6C and 6D are graphs with time as a reference, illustrating the manner in which a capacitor in FIG. 6 is charged in response to error pulses.
Figure 6D:
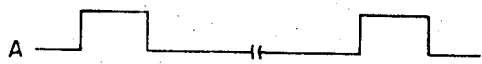

Referring to the curves in FIGS. 6C and 6D, the curves A illustrate the duration and therefore the width of the 1 error pulses appearing at the input terminal F and the curve B the polarity and level of the charging current to the capacitor C5 which is formed as a result of the error pulses at the terminal F. The curve A in FIG. 6D illustrates the width of the 1 error pulses when the error pulses have their maximum width which will cause a maximum energization of the motor 26. The curve A in FIG. 6C illustrates the width of a 1 error pulse as the machine 10 is approaching the commanded position while the duration of the error pulse is progressively decreasing to zero. While not shown, it is apparent that the 0 pulses at the input terminal R would cause the capacitor C5 to be charged in a manner similar to that shown in FIGS. 6C and 6D except the polarity of the curves A and B is reversed.

As illustrated by the curves in FIG. 6D, during intervals when the width of the error pulse is maximum, the charging current pulse width for the capacitor C5 will be maximum and appear as a current pulse which abruptly increases to its maximum value as indicated by a point *a* and then exponentially decreases to a minimum value as indicated by the portion *b* of the pulse until it is terminated at point *c*. When the width of the error pulse is small, as indicated by the curves in FIG. 6C, the charging current pulse for the capacitor C5 will abruptly increase to the same value *a* as the pulse in FIG. 6D and then decrease for a brief interval along curve *b* at the same rate as the curve portion *b* in FIG. 6D. However, as the width of the pulses in FIG. 6C is appreciably smaller than the width of the pulses in FIG. 6D, the level of the current at point *c* in FIG. 6C will be appreciably greater than the level of the current at point *c* in FIG. 6D. The operational amplifier module 87 is arranged to provide an output signal which has a voltage level that is proportional to the total energy of the current pulse which charges the capacitor C5. Thus the capacitor C5 will provide an exponential relationship between the error pulse width and the D.C. value of the voltage output of the module 87. As illustrated by the curves in FIGS. 6C and 6D, as the width of the error pulse becomes smaller, the ratio of the width of the error pulse to the level of the D.C. voltage output of the module 87 becomes greater which produces the equivalent effect of providing a higher gain and faster response to a small error signal and a lower gain when the circuit is responding to a large error signal. Thus the de-celeration module 62 will cause the de-energization of the motor 26 to be reduced at increased rate rather than linearly as the rate of travel of the machine 10 is reduced as the machine 10 approaches its commanded position.

The transistor T7, and the resistors R13 and R14 are included in the circuit to assure the cut-off of the field effect transistor FE during intervals when the capacitor C5 is being charged. If desired, the transistor T7 and the resistors R13 and R14 may be eliminated, providing a connection is made between the junctions 82 and 85 to cause the conductive state of the field effect transistor FE to follow the changes in the conductive states of the transistors T5 and T6, as previously described.

One of the advantages achieved by the circuitry within the deceleration module 62 is that the time required to position the machine 10 is reduced when the machine 10 is required to move short increments to provide welds at closely spaced locations on the workpieces 11 and 12. It is well known that the commutation capability of a direct current motor is non-linear in that a direct current motor inherently is capable of commutating greater current values at slow speeds than at high speeds. This non-linear commutating characteristic limits the rate at which the motor can be decelerated to the commutation capability of the motor at its highest speed. For example, the motor as herein used is capable of commutating 50 amperes without appreciable sparking when the motor is near its stalled condition and 15 amperes when the motor is operating at its highest speed. Also, it is well known to use leadlag capacitors in servo drive systems to modify the deceleration rate of a motor by charging the lead-lag capacitor during the period when the motor is rotating at a high speed and using the charge on the capacitor to delay the de-energization of the motor as the motor speed is reduced. However, a lead-lag capacitor control circuit inherently possesses the objectionable characteristic in that during short movements of the machine, the capacitor will not be charged to a level which will appreciably change the deceleration rate of the motor. In the deceleration module 62 as herein disclosed, during short movements of the machine 10, the speed of the motor 26 will increase along the line C, as in FIG. 6A, to the solid line curve, rather than to the broken line curve and decelerate along the solid line curve B rather than the broken line curve A which would occur if the speed of the motor was controlled by a lead-lag capacitor circuit.

The embodiments of the invention in which an exclusive property or privilege is claimed are defined as follows:

1. A control circuit for comparing a feedback signal with a command signal during each cycle of a reference wave and providing an output error signal for controlling the speed of a motor in response to the difference in time of occurrence between a change from a first voltage level to a second voltage level of the feedback and the command signals and the direction of rotation of the motor in response to the order of occurrence of the voltage change of the feedback and the command signals, comprising: means including a first bistable state flip flop having a first input receiving the command signal and arranged to be switched from a first of its bistable states to a second of its bistable states by the change in the command signal when a logic 1 signal is present at a second of its inputs and arranged to remain in its first state when a logic 0 is present at its second input, means including a second bistable state flip flop having a first input receiving the feedback signal and arranged to be switched from the first of its bistable states to a second of its bistable states by the change in the feedback signal when a logic 1 signal is present at a second of its inputs and arranged to remain in its first state when a logic 0 is present at its second input, means responsive to the feedback signal for supplying the second input of the first flip flop with a logic 0 signal when the feedback signal is at the second voltage level and the second flip flop is in its first state, means responsive to the command signal for supplying the second input of the second flip flop with a logic 0 signal when the command signal is at the second voltage level and the first flip flop is in its first state, means responsive to an output of the first flip flop for causing the motor to be energized for rotation in one direction when the first flip flop is in its second state, means responsive to an output of the second flip flop for causing the motor to be energized for rotation in a direction opposite the said one direction when the flip flop is in its second state, and means including a third flip flop responsive to an output of the first flip flop and an output of the second flip flop for switching the first and the second flip flops to their respective first states when the first and the second flip flops are simultaneously in their second states.

2. A control circuit for comparing a coarse feedback signal and a fine feedback signal respectively with a coarse command signal and a fine command signal during each cycle of a reference wave and providing an error signal for controlling the speed of a motor in response to the difference in time of occurrence between a change from a first voltage level to a second voltage level of the feedback and the command signals and the direction of rotation of the motor in response to the order of occurrence of the voltage change of the feedback and the command signals, comprising: means including a bistable state coarse command flip flop having an input responsive to the change in the coarse command signal to condition the flip flop so the flip flop is switched from its ON to its OFF state by an input signal at its toggle and an input responsive to the change in the coarse feedback signal for maintaining the flip flop in its ON state, means including a bistable state coarse feedback flip flop having an input responsive to the change in the coarse feedback signal to condition the flip flop so the flip flop is switched from its ON to its OFF state by an input signal at its toggle and an input responsive to the change in the coarse command signal for maintaining the flip flop in its ON state, timing means including a bistable state timing flip flop having an input responsive to the changes in the coarse feedback signal and the coarse command signal and an output providing the output signals to the toggles of the coarse command flip flop and the coarse feedback flip flop for switching the conditioned coarse command flip flop or the coarse feedback flip flop from their ON to OFF states a predetermined time interval subsequent to the change in the coarse command signal or the coarse feedback signal respectively when the interval between the occurrence of the changes in the coarse command and the coarse feedback signals is greater than the predetermined interval and for maintaining the coarse command flip flop and the coarse feedback flip flops in their respective ON states when the interval between the occurrence of the changes in the coarse command and the coarse feedback signals is less than the predetermined interval, a first control means responsive to an output of the coarse command flip flop for energizing the motor for rotation in a first direction at a pre-determined speed when the coarse command flip flop is in its OFF state, a second control means responsive to an output of the coarse feedback flip flop for energizing the motor for rotation in a direction opposite the first direction at a predetermined speed when the coarse feedback flip flop is in its OFF state, and a fine feedback and fine command signal comparison means operable when the coarse command and the coarse feedback flip flops are in their ON states and responsive to the fine command and fine feedback signals for respectively supplying the first and the second control means with input signals which will cause the motor to rotate in a direction dependent upon the order of occurrence of the changes in the fine command and the fine feedback signals at a speed dependent upon the interval between the occurrence of the changes in the fine feedback and fine command signals.

3. The control circuit as recited in claim 2 wherein the fine feedback and fine command signal comparison means includes: a first bistable state flip flop having a first input receiving the fine command signal and arranged to be switched from an ON state to an OFF state by the change in the fine command signal when a logic 1 signal is present at a second of its inputs and arranged to remain in its ON state when a logic 0 is present at its second input, a second bistable state flip flop having a first input receiving the fine feedback signal and arranged to be switched from its ON state to its OFF state by the change in the fine feedback signal when a logic 1 is present at a second of its inputs and arranged to remain in its ON state when a logic 0 is present at its second input, means responsive to the feedback signal for supplying the second input of the first flip flop with a logic 0 signal when the fine feedback signal is at the second voltage level and the second flip flop is in its ON state, means responsive to the fine command signal for supplying the second input of the second flip flop with a logic 0 signal when the fine command signal is at the second voltage level and the first flip flop is in its ON state, means responsive to an output of the first flip flop and supplying an input to the first control means for energizing the motor for rotation in the first direction when the first flip flop is in its OFF state, means responsive to an output of the second flip flop and supplying an input to the second control means for energizing the motor for rotation in the opposite direction when the second flip flop is in its OFF state, and means including a third flip flop responsive to an output of the first flip flop and an output of the second flip flop for switching the first and the second flip flops to their ON states when the first and the second flip flops are simultaneously in their OFF states.

4. A circuit for controlling the speed, direction of rotation and deceleration of an electric motor in response to a train of constant frequency pulses at each of two terminals with the pulses at the first of the two terminals appearing as a logic 1 pulse which changes from a logic 0 and progressively decreases from a constant width to zero to cause the motor rotation in a first direction to be decreased from a constant speed to zero and the pulses at a second of the two terminals appearing as a logic 0 pulse which changes from a logic 1 and progressively decreases from a constant width to zero to cause the motor rotation in a second direction that is the reverse of the first direction to decrease from a constant speed to zero, comprising: a capacitor, means controlled by the train of pulses at the two terminals for maintaining the capacitor in a discharged state when the first and the second terminals are simultaneously 0 and 1 respectively and when the first and the second terminals are simultaneously 1 and 0 respectively and for causing the capacitor to be charged in a first direction with a current flowing in a first direction during periods when the first and the second terminals are simultaneously 1 and for causing the capacitor to be charged in a second direction with a current flowing in a second direction during periods when the first and the second terminals are simultaneously 0, and means including an operational amplifier having an input responsive to the direction of flow of the charging current and the total current energy required to charge the capacitor in response to the pulses appearing at the first and second terminals and providing an output for causing the motor to rotate in the first direction in response to the direction of the charging current flow at a speed proportional to the total current energy required to charge the capacitor in the first direction and for causing the motor to rotate in the second direction in response to the direction of the charging current flow at a speed proportional to the total current energy required to charge the capacitor in the second direction.

5. The circuit as recited in claim 4 wherein the means for maintaining the capacitor in a discharged state and for causing the capacitor to be charged in a discharged state in response to the pulses at the two terminals includes: a junction, means including a pair of transistors respectively having their bases connected to the first and the second terminals for maintaining the junction at a common potential when the first and the second terminals are simultaneously 0 and 1 respectively and when the first and the second terminals are simultaneously 1 and 0 respectively and for causing the junction to have a first polarity during periods when the first and the second terminals are simultaneously 1 and a polarity opposite the first polarity when the first and second terminals are simultaneously 0, a means including a field effect transistor having a source and drain electrode connected across the capacitor and biased to a nonconductive state during periods when the first and second terminals are simultaneously 1 or 0, and means connecting the capacitor in a bidirectional charging circuit between the junction and the input of the operation amplifier.

6. The circuit as recited in claim 4 wherein the means for maintaining the capacitor in the discharged state and for causing the capacitor to be charged in response to the pulses at the two terminals includes a pnp type transistor and a npn type transistor, said transistors having their collectors respectively connected through load resistors to a negative voltage source and a positive voltage source, their emitters connected to a terminal that is common to the negative and the positive voltage sources, and their bases respectively connected to the first and the second terminals, a field effect transistor having its source and drain electrodes connected across the capacitor, and a gate electrode arranged to bias the field effect transistor against conduction when the gate electrode is negative in polarity relative to its source and drain electrodes, a first voltage divider having two opposite ends respectively connected to the collectors of the npn transistor and the pnp transistor and a junction intermediate the ends providing a voltage potential equal to one half the potential across the opposite ends, a second voltage divider having two opposite ends respectively connected between the collector of the npn type transistor and the negative polarity source and a junction providing a potential that is negative relative to the collector of the pnp transistor when the npn and the pnp transistors are conducting, a potential that is positive relative to the collector of the pnp transistor when the pnp and the npn transistors are nonconducting, a potential that is positive relative to the collector of the pnp transistor when the pnp transistor is nonconducting and the npn transistor is conducting and a potential that is positive relative to the collector of the pnp transistor when the npn transistor is nonconducting and the pnp transistor is conducting, a second pnp type transistor having an emitter connected to the collector of the pnp transistor, a base connected to the junction of the second voltage divider and a collector connected to the gate of the field effect transistor and the negative polarity source, and a capacitor charging circuit connecting a first side of the capacitor to the junction of the first voltage divider and a second side of the capacitor to an input of the operational amplifier, said charging circuit including a pair of reversely poled diodes connected to cause the capacitor to be charged with current flow in one direction when the npn transistor is nonconducting and the pnp transistor is conducting and with current flow in a direction opposite the said one direction when the pnp transistor is nonconducting and the npn transistor is conducting.

* * * * *